(12) United States Patent
Kim et al.

(10) Patent No.: US 11,390,966 B2
(45) Date of Patent: Jul. 19, 2022

(54) POLYMER-GRAPHENE LIQUID CRYSTAL FIBER AND A CARBON FIBER PRODUCED BY THE SAME AND METHOD FOR MANUFACTURING THE SAME

(71) Applicant: KOREA ADVANCED INSTITUTE OF SCIENCE AND TECHNOLOGY, Daejeon (KR)

(72) Inventors: Sang Ouk Kim, Daejeon (KR); In Ho Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 182 days.

(21) Appl. No.: 16/235,508

(22) Filed: Dec. 28, 2018

(65) Prior Publication Data
US 2020/0181808 A1    Jun. 11, 2020

(30) Foreign Application Priority Data
Dec. 7, 2018   (KR) .................. 10-2018-0157301

(51) Int. Cl.
  *C01B 32/194*   (2017.01)
  *D01F 9/20*     (2006.01)
  *D01D 5/06*     (2006.01)
  *C08L 85/00*    (2006.01)

(52) U.S. Cl.
  CPC .............. *D01F 9/20* (2013.01); *C01B 32/194* (2017.08); *C08L 85/00* (2013.01); *D01D 5/06* (2013.01); *C08L 2203/12* (2013.01)

(58) Field of Classification Search
  CPC ..... D01F 9/20; D01F 6/26; D01F 1/10; C01B 32/194; D01D 5/06; D01D 1/02; C08L 85/00; C08L 2203/12; C08F 292/00
  See application file for complete search history.

(56) References Cited

FOREIGN PATENT DOCUMENTS

| CN | 107401046 A | 11/2017 |
|----|-------------|---------|
| CN | 107489018 A | 12/2017 |
| KR | 10-2012-0107026 A | 9/2012 |
| KR | 10-2018-0039329 A | 4/2018 |
| KR | 10-1853590 B1 | 4/2018 |
| KR | 20180039329 A * | 4/2018 |

OTHER PUBLICATIONS

Zeng, Jie, et al. "Mechanical property enhancement of high conductive reduced graphene oxide fiber by a small loading of polydopamine." Materials Research Express 5.4 (2018): 045602.*

(Continued)

*Primary Examiner* — Richard M Rump
(74) *Attorney, Agent, or Firm* — Knobbe Martens Olson & Bear LLP

(57) ABSTRACT

Provided is a manufacturing method of a graphene-based liquid crystal fiber including: polymerizing a first aromatic monomer on a graphene-based compound to prepare a graphene composite in which a first aromatic polymer is surface-polymerized on the graphene-based compound; wet-spinning the graphene composite to manufacture a hydrogel fiber; and polymerizing a second aromatic monomer on the hydrogel fiber to fill pores of the hydrogel fiber with a second aromatic polymer.

14 Claims, 7 Drawing Sheets

(56) References Cited

OTHER PUBLICATIONS

Yokoyama, Koji, et al. "Work function, carrier type, and conductivity of nitrogen-doped single-walled carbon nanotube catalysts prepared by annealing via defluorination and efficient oxygen reduction reaction." Carbon 142 (2019): 518-527.*

English machine translation of CN 107401046 (2017).*

Office Action of corresponding Korean Patent Application No. 10-2018-0157301—9 pages (dated Dec. 16, 2019).

Kim et al., "Mussel-Inspired Defect Engineering of Graphene Liquid Crystalline Fibers for Synergistic Enhancement of Mechanical Strength and Electrical Conductivity", Advanced Materials—9 pages (Aug. 8, 2018).

* cited by examiner

POLYMER-GRAPHENE LIQUID CRYSTAL FIBER AND A CARBON FIBER PRODUCED BY THE SAME AND METHOD FOR MANUFACTURING THE SAME

CROSS-REFERENCE TO RELATED APPLICATIONS

This application claims priority under 35 U.S.C. § 119 to Korean Patent Application No. 10-2018-0157301, filed on Dec. 7, 2018, in the Korean Intellectual Property Office, the disclosure of which is incorporated herein by reference in its entirety.

TECHNICAL FIELD

The following disclosure relates to a high molecular graphene-based liquid crystal fiber, a graphene-based carbon fiber manufactured therefrom, and a manufacturing method thereof. More particularly, the following disclosure relates to a graphene-based liquid crystal fiber in which an aromatic polymer is bonded to a graphene-based compound, a graphene-based carbon fiber manufactured by carbonizing the graphene-based liquid crystal fiber, and a manufacturing method thereof.

DISCUSSION OF THE RELATED TECHNOLOGY

Graphene is a material having very good physical properties such as mechanical physical properties, electrical conductivity, thermal conductivity, and electrical properties, and a study for commercializing graphene is actively being conducted. Graphene oxides are easily surface-modified due to a functional group formed on the surface and may be chemically bonded to a functional material, thereby being evaluated as a promising material.

Recently, a method of manufacturing a liquid crystal fiber by a wet spinning process which may maximize orientation and interaction of graphene oxides has been developed, and the method has a merit of allowing mass production and having low production costs. Korean Patent Laid-Open Publication No. 10-2012-0107026 discloses related technology.

SUMMARY

An embodiment of the present invention is directed to providing a graphene-based carbon fiber having a dense texture with substantially no pores in the fiber by suppressing formation of defects and pores arising from a folding and wrinkling phenomenon of a graphene-based compound which occurs during manufacture of a graphene-based liquid crystal fiber, simultaneously with providing a graphene-based liquid crystal fiber which is a precursor material allowing manufacture of the graphene-based carbon fiber.

Another embodiment of the present invention is directed to providing a manufacturing method of a graphene-based carbon fiber having both improved mechanical physical properties and electrical conductivity.

In one general aspect, a manufacturing method of a graphene-based liquid crystal fiber includes: (a) polymerizing a first aromatic monomer on a graphene-based compound to prepare a graphene composite in which a first aromatic polymer is surface-polymerized on the graphene-based compound; (b) wet-spinning the graphene composite to manufacture a hydrogel fiber; and (c) polymerizing a second aromatic monomer on the hydrogel fiber to fill pores of the hydrogel fiber with a second aromatic polymer.

In the manufacturing method of a graphene-based liquid crystal fiber according to an exemplary embodiment of the present invention, a weight ratio of the graphene-based compound to the first aromatic monomer may be 1:0.01 to 1:10.

In the manufacturing method of a graphene-based liquid crystal fiber according to an exemplary embodiment of the present invention, in step (a), the first aromatic polymer which is surface-polymerized on the graphene-based compound may form a surface layer with a thickness of 0.2 to 1 nm.

In the manufacturing method of a graphene-based liquid crystal fiber according to an exemplary embodiment of the present invention, in step (a), the surface polymerization of the first aromatic monomer may include oxidation polymerization of the first aromatic monomer on a surface of the graphene-based compound.

In the manufacturing method of a graphene-based liquid crystal fiber according to an exemplary embodiment of the present invention, a weight ratio of the graphene composite to the second aromatic monomer may be 1:0.1 to 1:100.

In the manufacturing method of a graphene-based liquid crystal fiber according to an exemplary embodiment of the present invention, the first aromatic monomer and the second aromatic monomer may include a phenolic compound containing an amine group.

In another general aspect, a manufacturing method of a graphene-based carbon fiber includes: (a) polymerizing a first aromatic monomer on a graphene-based compound to prepare a graphene composite in which a first aromatic polymer is surface-polymerized on the graphene-based compound; (b) wet-spinning the graphene composite to manufacture hydrogel fiber; (c) filling pores of the hydrogel fiber with a second aromatic polymer to manufacture a graphene-based liquid crystal fiber; and (d) carbonizing the graphene-based liquid crystal fiber.

In the manufacturing method of a graphene-based carbon fiber according to an exemplary embodiment of the present invention, the manufacture of the graphene-based liquid crystal fiber of step (c) may include polymerizing a second aromatic monomer on the hydrogel fiber to fill pores of the hydrogel fiber with the second aromatic polymer.

In another general aspect, a graphene-based liquid crystal fiber includes a hydrogel fiber manufactured by wet-spinning a graphene-based compound modified with a first aromatic polymer and a second aromatic polymer filled in pores of the hydrogel fiber.

In the graphene-based liquid crystal fiber according to an exemplary embodiment of the present invention, the first aromatic monomer and the second aromatic monomer may be a phenolic compound containing a nitrogen atom in a structural unit.

In the graphene-based liquid crystal fiber according to an exemplary embodiment of the present invention, $I_D/I_G$ of the graphene-based compound and the graphene-based compound modified with the first aromatic polymer may satisfy the following Equation 1:

$$(I_D/I_G)_G / (I_D/I_G)_C > 1 \qquad \text{[Equation 1]}$$

wherein $I_D/I_G$ is a measure of relative crystallinity which represents density of defects, and is calculated as a ratio of a maximum intensity value of a peak of an absorption region at $1350\pm10$ cm$^{-1}$ ($I_D$) to a maximum intensity value of a peak of an absorption region at $1590\pm10$ cm$^{-1}$ ($I_G$), in Raman spectroscopic analysis, $(I_D/I_G)_G$ refers to $I_D/I_G$ of the graphene-based compound, and $(I_D/I_G)_C$ refers to $I_D/I_G$ of a graphene composite modified with the first aromatic polymer.

In the graphene-based liquid crystal fiber according to an exemplary embodiment of the present invention, adhesion of the graphene composite modified with the first aromatic polymer may satisfy the following Equation 2:

$$F_C/F_G > 2 \qquad \text{[Equation 2]}$$

wherein $F_G$ refers to adhesion between the graphene-based compounds, and Fe refers to adhesion of the graphene composite modified with the first aromatic polymer.

In still another general aspect, a graphene-based carbon fiber includes a graphene-based compound and a graphitic nitrogen, wherein the graphene-based carbon fiber has an electrical conductivity of $1 \times 10^4$ S/m or more.

In the graphene-based carbon fiber according to an exemplary embodiment of the present invention, the graphene-based carbon fiber may have a tensile strength of 300 MPa or more.

In the graphene-based carbon fiber according to an exemplary embodiment of the present invention, the graphene-based carbon fiber may include the graphitic nitrogen of 2 to 10 atom %.

In the graphene-based carbon fiber according to an exemplary embodiment of the present invention, an inside of the graphene-based carbon fiber may be formed of a dense texture which substantially does not include pores.

The manufacturing method of the graphene-based liquid crystal fiber according to various exemplary embodiments of the present invention suppresses formation of defects and pores arising from a folding and wrinkling phenomenon of the graphene-based compound occurring during spinning of the fiber, maintains the liquid crystal structure, and allows the texture of the graphene-based liquid crystal fiber to be dense.

In addition, the graphene-based liquid crystal fiber according to various exemplary embodiments of the present invention may have a high diameter uniformity and orientation, and the graphene-based liquid crystal fiber may have a dense texture which substantially does not include defects and pores in the graphene-based carbon fiber, by a carbonation step.

In addition, the manufacturing method of the graphene-based carbon fiber according to various exemplary embodiments of the present invention has a merit of improving both mechanical physical properties and electrical conductivity of the graphene-based carbon fiber.

DETAILED DESCRIPTION OF EMBODIMENTS

Figure 1:
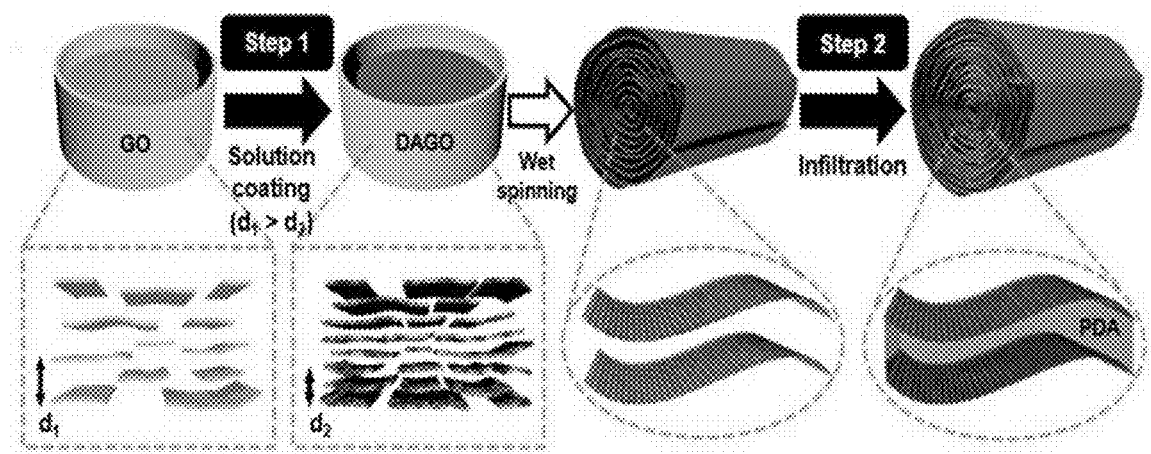
FIG. 1 is a schematic diagram representing a manufacturing process of a graphene-based liquid crystal fiber according to the present invention in which GO is a graphene-based compound of Preparation Example 1, DAGO is a graphene composite of Preparation Example 2, and PDA is an aromatic polymer.

Hereinafter, the present invention will be described in more detail with reference to the exemplary embodiments and Examples including the accompanying drawings. However, the following exemplary embodiments or Examples are only a reference for describing the present invention in detail, and the present invention is not limited thereto, and may be implemented in various forms.

In addition, unless otherwise defined, all technical terms and scientific terms have the same meanings as those commonly understood by a person skilled in the art to which the present invention pertains. The terms used in the present disclosure is only for effectively describing a certain exemplary embodiment, and not intended to limit the present invention.

In addition, the singular form used in the specification and claims appended thereto may be intended to also include a plural form, unless otherwise particularly indicated in the context.

In addition, units used in the present disclosure without particular mention is based on weights, and as an example, a unit of % or ratio refers to a wt % or a weight ratio.

In addition, unless otherwise defined in the present disclosure, a molecular weight of a polymer refers to a weight average molecular weight.

In addition, the numerical range used in the present disclosure includes all values within the range including the lower limit and the upper limit, increments logically derived in a form and span in a defined range, all double limited values, and all possible combinations of the upper limit and the lower limit in the numerical range defined in different forms. As an example, a molecular weight limited to 100 to 10,000, and specifically 500 to 5,000 should be interpreted as being that a numerical range of 500 to 10,000 or 100 to 5,000 is also described in the present disclosure. Unless otherwise particularly defined in the present disclosure, values which may be outside a numerical range due to experimental error or rounding of a value are also included in the defined numerical range.

In addition, in the present disclosure, the expression, "comprise" is an open-ended description having a meaning equivalent to the expression such as "provide", "contain", "have" or "is/are characterized", and does not exclude elements, materials or processes which are not further listed. In addition, the expression, "substantially consisting of . . . " means that other elements, materials, or processes which are not listed together with specified elements, materials, or processes may be present in amounts which do not have an unacceptable significant influence on at least one basic and novel technical idea of the invention. In addition, the expression, "consisting of" means that only the described elements, materials, or processes are present.

In addition, in the present disclosure, a hydrogel refers to a solid material including a hydrophilic polymer which is swellable in water as a solvent, and has a high viscosity in a normal state so as not to be substantially deformed or three-dimensionally has a physical or chemical crosslink, thereby not having flowability.

In addition, in the present disclosure, a "polymer" refers to a polymerized product of one or more monomers, may have the same meaning as a "high molecule", and unless otherwise defined, includes a homopolymer, an interpolymer, a copolymer, a terpolymer, and the like, as well as any mixed and modified forms among the said polymer forms including block, graft, addition or condensation of the polymers.

Due to a phenomenon in which graphene oxide flakes having a high aspect ratio in the liquid crystal fiber are folded by electrical repulsive force between oxygen functional groups and large shape anisotropy, a plurality of defects such as pores and wrinkles in fiber may occur. Such defects may be a factor to degrade mechanical, thermal and electrical physical properties, and the like of a liquid crystal fiber based on graphene, and one aspect of the present invention is to provide technology capable of controlling defects inside the liquid crystal fiber based on graphene.

Various methods for manufacturing composite fibers by mixing a high molecular material having good dispersibility with a graphene oxide dispersion may be presented, however, most of the high molecules have insulation properties to make it difficult to implement excellent electrical conductivity unique to graphene, and in this case, the high molecules may be mainly used to improve mechanical physical properties. Therefore, one aspect of the present invention is to provide a manufacturing technology capable of maintaining and improving electrical conductivity of the liquid crystal fiber based on graphene and also improving mechanical physical properties thereof.

The manufacturing method of a graphene-based liquid crystal fiber according to an exemplary embodiment of the present invention includes: (a) polymerizing a first aromatic monomer on a graphene-based compound to prepare a graphene composite in which a first aromatic polymer is surface-polymerized on the graphene-based compound; (b) wet-spinning the graphene composite to manufacture a hydrogel fiber; and (c) polymerizing a second aromatic monomer on the hydrogel fiber to fill pores of the hydrogel fiber with a second aromatic polymer.

The graphene-based compound may be in a suspension state in which a graphene-based material is dispersed in an aqueous solution. The graphene-based material may be a mixture of any one or two or more selected from the group consisting of reduced graphene (RG), reduced graphene oxide (RGO), graphene, graphene oxide (GO), and the like, and for improving dispersibility and compatibility in the aqueous solution, in an exemplary embodiment, the graphene-based material may be graphene oxide (GO).

The graphene oxide may be used to mean graphene oxide, graphene oxides, oxidized graphene, and the like. Specifically, graphene oxide is not limited when it is prepared by a commonly used preparation method of graphene oxide; however, specifically, may be prepared by a method of oxidizing a carbon material such as graphite. More specifically, graphene oxide prepared by oxidizing graphite by an oxidization method such as a Hummers method, a Brodie method, or a Staudenmaier method may be used.

The graphene oxide may have an average long axis diameter of 500 μm or less, specifically 100 μm or less, and more specifically 50 nm or more and 50 μm or less, but not limited thereto.

The first aromatic monomer and the second aromatic monomer may be identical to or different from each other, and may be a phenolic compound containing an amine group. For example, the phenolic compound containing the amine group may include a compound represented by the following Chemical Formula 1 or a salt thereof:

[Chemical Formula 1]

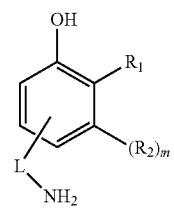

wherein $R_1$ is any one selected from the group consisting of hydrogen, hydroxy, carboxylic acid, and salts thereof;

$R_2$ is independently of each other any one or a combination of two or more selected from the group consisting of (C1-C10)alkyl, (C1-C10)alkenyl, (C3-C20)cycloalkyl, (C3-C20)heterocycloalkyl, (C6-C20)aryl, (C3-C20)heteroaryl, nitro, cyano, $-C(=O)R_{11}$, and $-C(=O)OR_{12}$;

$R_{11}$ and $R_{12}$ are independently of each other any one or a combination of two or more selected from the group consisting of hydrogen, (C1-C10)alkyl, (C3-C20)cycloalkyl, (C3-C20)heterocycloalkyl, (C6-C20)aryl, and (C3-C20)heteroaryl;

L is a divalent linking group;

m is an integer of 1 to 3;

when m is 2 or more, $R_2$ may be connected to an adjacent substituent to form a ring; and when alkyl, alkenyl, cycloalkyl, heterocycloalkyl, aryl, or heteroaryl of $R_2$, $R_{11}$, and $R_{12}$ may be independently of each other substituted by any one or more substituents selected from the group consisting of hydroxy, carboxylic acid, (C1-C10)alkoxy, (C1-C10)alkyl carbonyl, a halogen, amine, cyano, nitro, and salts thereof.

In Chemical Formula 1, L may be an optional divalent linking group may, may be bonded to an optional position of a phenol ring, and in an exemplary embodiment, may be bonded at a para position. The alkyl, alkenyl, and alkoxy include all forms of straight chains and branched chains.

Meanwhile, when two or more substituents are combined, it means that two or more substituents are covalently bonded to each other, and as an example, when (C1-C10)alkyl and (C6-C20)aryl are combined, it means that they have a structure of *—(C1-C10)alkyl-(C6-C20)aryl or *—(C6-C20)aryl-(C1-C10)alkyl.

The phenolic amine (phenolic compound containing an amine group) is a hydrophilic monomer containing one or more hydroxyl groups in the molecule and has excellent solubility in an aqueous solution as a medium, thereby causing oxidation polymerization. Accordingly, phenolic amine may form a phenolic polymer as the first aromatic monomer on a surface of the graphene compound to produce the graphene composite by oxidation polymerization.

In the compound represented by Chemical Formula 1, $R_1$ is hydrogen or hydroxy; L is (C1-C10)alkylene or (C1-C10)alkenylene, —$CH_2$— of the alkylene or alkenylene may be replaced with any one selected from the group consisting of —N($R_{13}$)—, —C(=O)NH—, —C(=O)O—, and —O—, $R_{13}$ may be any one selected from the group consisting of hydrogen, (C1-C10)alkyl and amino(C1-C10)alkyl, and the alkylene and alkenylene of L may be further substituted by any one or more substituents selected from the group consisting of a halogen, hydroxy, amine, carboxylic acid, (C1-C10)alkoxy, (C1-C10)alkylcarbonyl, and salts thereof.

When L is substituted by any one or more substituents selected from the group consisting of a halogen, hydroxy, amine, carboxylic acid, (C1-C10)alkoxy, (C1-C10)alkylcarbonyl, and salts thereof, it means that the hydrogen atom of alkylene or alkenylene is substituted by the substituents.

Specifically, L is (C1-C6)alkylene or (C1-C6)alkenylene, —$CH_2$— of the alkylene or alkenylene may be replaced with any one selected from the group consisting of —N($R_{13}$)—, —C(=O)NH—, —C(=O)O—, and —O—, and $R_{13}$ may be any one selected from the group consisting of (C1-C6)alkyl and amino(C1-C6)alkyl. The alkylene and alkenylene of L may be further substituted by one or more substituents selected from the group consisting of a halogen, hydroxy, amine, carboxylic acid, (C1-C6)alkoxy, (C1-C6)alkylcarbonyl, and salts thereof.

$R_2$ is independently of each other any one or a combination of two or more selected from the group consisting of (C1-C6)alkyl, (C1-C6)alkenyl, (C3-C10)cycloalkyl, (C3-C10)heterocycloalkyl, (C6-C10)aryl, (C3-C10)heteroaryl, nitro, cyano, —C(=O)$R_{11}$, and —C(=O)O$R_{12}$; the alkyl, alkenyl, cycloalkyl, heterocycloalkyl, aryl, or heteroaryl of $R_2$, $R_{11}$, and $R_{12}$ may be independently of each other substituted by any one or more substituents selected from the group consisting of hydroxy, carboxylic acid, (C1-C10)alkoxy, (C1-C10)alkylcarbonyl, a halogen, amine, cyano, nitro, and salts thereof.

More specifically, L is (C1-C3)alkylene, —$CH_2$— of the alkenylene may be replaced with any one selected from the group consisting of —N($R_{13}$)—, —C(=O)NH—, —C(=O)O—, and —O—, and $R_{13}$ may be any one selected from the group consisting of (C1-C3)alkyl and amino(C1-C3)alkyl. Here, the alkylene and alkylene of L may be further substituted by one or more substituents selected from the group consisting of hydroxy, amine, carboxylic acid, and salts thereof.

$R_2$ is independently of each other any one or a combination of two or more selected from the group consisting of (C1-C6)alkyl, (C1-C6)alkenyl, (C3-C10)cycloalkyl, (C3-C10)heterocycloalkyl, (C6-C10)aryl, and (C3-C10)heteroaryl; the alkyl, alkenyl, cycloalkyl, heterocycloalkyl, aryl, or heteroaryl of $R_2$ may be independently of each other substituted by any one or more substituents selected from the group consisting of hydroxy, carboxylic acid, (C1-C10)alkoxy, (C1-C10)alkylcarbonyl, a halogen, amine, and salts thereof.

Specifically, the phenolic amine may be any one or a mixture of two or more selected from the group consisting of tyramine, dopamine quinone, dopamine, α-methyl dopamine, norepinephrine, epinephrine, α-methyldopa, indolamine, serotonin, 5-hydroxydopamine, and salts thereof, and in an exemplary embodiment, may be dopamine or a dopamine salt, but not limited thereto.

In the manufacturing method of a graphene-based liquid crystal fiber according to an exemplary embodiment of the present invention, step (a) includes polymerizing the first aromatic monomer on the graphene-based compound to prepare the graphene composite in which the first aromatic polymer is surface-polymerized on the graphene-based compound.

The graphene-based compound may be in a state of being dispersed in an aqueous solution, and may be a graphene oxide dispersion from which impurities such as ionic impurities were removed by a known means. In an exemplary embodiment, the graphene oxide dispersion may represent a liquid crystal state in an aqueous solution.

The surface polymerization of the first aromatic monomer causes oxide polymerization on the surface of the graphene-based compound to form a covalent bond between the first aromatic polymer and the graphene-based compound to form a coating layer, and the graphene-based compound coated with the first aromatic polymer means the graphene composite. Though the graphene composite is coated with the first aromatic polymer, the graphene composite may represent liquid crystallinity, and as an example, the liquid crystallinity may be a nematic phase.

The graphene oxide dispersion may be a basic aqueous solution, and the first aromatic monomer may be dissolved in the basic aqueous solution to be oxidatively polymerized spontaneously. A pH of the basic aqueous solution may be 7.0 or more, specifically 7.0 to 14, more specifically 7.5 to 12, and more specifically in a range of 8.0 to 10. The basic aqueous solution may include a buffer solution, which may be selected from known buffer solutions such as Tris-HCl and a phosphate buffer solution, and in an exemplary embodiment, may be a Tris-HCl buffer solution, but not limited thereto.

The first aromatic monomer may be polymerized by adding the first aromatic monomer in a state of being dissolved in the basic aqueous solution to the graphene oxide dispersion, and the oxidation polymerization of the first aromatic monomer is initiated in the basic aqueous solution. That is, the first aromatic monomer may be polymerized into the first aromatic polymer by pH-induced self-polymerization, and the first aromatic polymer is surface-polymerized on the surface of the graphene oxide to form a covalent bond between the first aromatic polymer and the graphene-based compound.

More specifically, when the first aromatic monomer is a phenolic compound containing an amine group, the amine group of the first aromatic monomer is reacted with a functional group containing oxygen of the graphene oxide during surface polymerization to form a covalent bond such as an amide bond.

The first aromatic polymer produced by the surface polymerization may be a water-insoluble hydrophilic phenolic polymer. As the phenolic compound containing an amine group as the first aromatic monomer is polymerized, the aromatic ring of the structural unit of the main chain has low water solubility so as not to be dissolved in water, and due to the water-insoluble property, coating may be stably performed on the graphene oxide surface. The first aromatic polymer has a water-insoluble property but contains a hydroxyl group in the aromatic ring of the structural unit of the main chain, thereby having high hydrophilicity, and the graphene composite which is the graphene-based compound coated with the first aromatic polymer may have excellent water-dispersibility.

More specifically, as an example, when the first aromatic monomer is dopamine, the dopamine may form a polydopamine which is the first aromatic polymer by self-polymerization in a basic pH range, the polydopamine is selectively surface-polymerized on the graphene oxide surface, and polydopamine and graphene oxide may form a covalent bond.

The polydopamine contains a catechol group and may form a n-n interaction between the catechol group of the polydopamine and the graphene oxide. The dopamine may be surface-polymerized into the polydopamine on the graphene oxide surface by a hydrogen bond between the hydroxyl group of the catechol and the hydrophilic functional group of the graphene oxide, thereby preparing the graphene composite.

As the polydopamine forms a coating layer, the surface of the graphene composite may have an improved binding force between the graphene composites. That is, as the binding force between the graphene composites is much better than the binding force between graphene oxide particles, adhesion may be excellent, and the hydrogel fiber which is wet-spun by the graphene composite may form a dense structure.

A weight ratio of the graphene-based compound to the first aromatic monomer may be 1:0.01 to 1:10, in an exemplary embodiment, may be 1:0.05 to 1:5, in another exemplary embodiment, may be 1:0.1 to 1:1, and in still another exemplary embodiment, may be 1:0.1 to 1:0.5. As polymerization is carried out at a weight ratio in the above range in the dispersion, the graphene-based composite and the graphene-based liquid crystal fiber may have liquid crystallinity and excellent spinnability.

A polymerization time of the first aromatic monomer may be 1 minute to 1000 minutes, specifically 5 minutes to 500 minutes, or 5 minutes to 300 minutes, and more specifically 10 minutes to 80 minutes. The graphene composite may maintain the liquid crystallinity during the polymerization time. In an exemplary embodiment, the polymerization time may be 10 minutes to 50 minutes, and during the polymerization time, the graphene composite and the graphene-based liquid crystal fiber obtained by spinning the graphene composite may maintain the liquid crystallinity, and the graphene composite may have excellent spinnability.

The graphene composite prepared using the weight ratio and the polymerization time of the graphene-based compound and the first aromatic monomer may form a surface layer of the first aromatic polymer at a thickness of 0.1 nm to 10 nm on the graphene-based compound. Specifically, the coating layer may be formed at a thickness of 0.15 nm to 5 nm, and more specifically 0.2 nm to 1 nm on the surface of the graphene-based compound. In an exemplary embodiment, the coating layer may be formed at a thickness of 0.2 to 0.5 nm.

In the manufacturing method of the graphene-based liquid crystal fiber according to an exemplary embodiment of the present invention, step (b) includes wet-spinning the graphene composite to manufacture a hydrogel fiber. The step of manufacturing the hydrogel fiber may be pressurizing the graphene composite to be spun into a solidification bath by a spinneret. The wet-spun hydrogel fiber is solidified in the solidification bath by a solidification solution, and as a solvent in the graphene composite is diffused into the solidification bath to proceed with solidification and be leached, the hydrogel fiber may be formed.

According to an exemplary embodiment of the present invention, any solidification solution may be used without limitation as long as the solidification solution solidifies the wet-spun graphene composite. For example, the solidification solution may be any one or a combination of two or more selected from the group consisting of an aqueous solution containing alkaline earth metal ions, an aqueous solution containing polyvalent metal ions, alcohol-based solvent, ketone-based solvent, ester-based solvent, ether-based solvent, and amine-based solvent. Specifically, the solidification solution may be any one or a mixture of two or more selected from the group consisting of an aqueous calcium chloride ($CaCl_2$) solution, an aqueous magnesium chloride solution, methanol, ethanol, methoxyethanol, propanol, isopropanol, butanol, isobutanol, acetone, methylethylketone, methylisobutylketone, ethyl acetate, butyl acetate, 3-methoxy-3-methylbutyl acetate, dimethyl formamide, methyl pyrrolidone, dimethyl acetamide, tetrahydrofuran, 2-methyltetrahydrofuran, dimethylether, dibutylether, and the like, but not limited thereto.

When the aqueous solution containing alkaline earth metal ions or polyvalent metal ions is used as the solidification solution, a concentration of the alkaline earth metal salt may be 0.1 to 20 wt %, and specifically 1 to 10 wt %.

According to an exemplary embodiment of the present invention, the hydrogel fiber may be manufactured by a spun fiber which is drawn by rotating the solidification bath during wet-spinning. The rotational speed may be 1 to 100 rpm, but not limited thereto. From the spun fiber which is spun by rotating the solidification bath at the rotational speed, the drawn hydrogel fiber may be manufactured. The drawn hydrogel fiber may have a draw ratio of 1.1 to 3 times, and specifically 1.2 to 2 times, and at the draw ratio, the drawn hydrogel fiber may have high liquid crystal orientation and mechanical properties.

An inner diameter of a nozzle in wet spinning may be 50 μm to 1000 μm, and more specifically 100 μm to 500 μm, but not limited thereto. Due to the inner diameter of the nozzle, the manufactured hydrogel fiber may also have an average long axis diameter of 50 μm to 1000 μm, and more specifically 100 μm to 500 μm.

According to an embodiment of the present invention, a spinning temperature of the spinning solution may be 10 to 100° C., and in an exemplary embodiment, may be 20 to 50° C., but not limited thereto. In addition, the spinning speed during spinning of the spinning solution may be in a range of 0.005 to 3 ml/min, specifically 0.01 to 1 ml/min, and more specifically 0.05 to 10.5 ml/min, but not limited thereto. The temperature of the solidification solution may be −5° C. to 100° C., and in an exemplary embodiment, may be 0° C. to 80° C. for solidification of the fiber to be spun, but not limited thereto.

In the manufacturing method of a graphene-based liquid crystal fiber according to an exemplary embodiment of the present invention, step (c) may include polymerizing the second aromatic monomer on the hydrogel fiber to fill pores of the hydrogel fiber with the second aromatic polymer.

As such, the second aromatic monomer is infiltrated into the pores of the hydrogel fiber to fill the hydrogel fiber with the second aromatic polymer, thereby manufacturing the graphene-based liquid crystal fiber.

The second aromatic monomer may be identical to or different from the first aromatic monomer, and may be a phenolic compound containing an amine group. For example, the phenolic compound containing an amine group may include a compound represented by Chemical Formula 1 or a salt thereof, as described above.

Specifically, the phenolic compound may be any one or a mixture of two or more selected from the group consisting of tyramine, dopamine quinone, dopamine, α-methyl dopamine, norepinephrine, epinephrine, α-methyldopa, indolamine, serotonin, 5-hydroxydopamine, and salts thereof, and in an exemplary embodiment, may be dopamine or a dopamine salt, but not limited thereto.

The step of filling pores of the hydrogel fiber with the second aromatic polymer may be immersing the hydrogel fiber in a water tank containing a basic aqueous solution in which the second aromatic monomer is dissolved, and infiltrating the second aromatic monomer into the hydrogel fiber.

That is, the second aromatic monomer may be polymerized by adding the second aromatic monomer in a state of being dissolved in the basic aqueous solution to the hydrogel fiber, and the oxidation polymerization of the second aromatic monomer is initiated in the basic aqueous solution. That is, the second aromatic monomer may be polymerized into the second aromatic polymer by pH-induced self-polymerization, and filled into the pores of the hydrogel fiber.

A weight ratio of the graphene composite to the second aromatic monomer forming the hydrogel fiber may be 1:0.1 to 1:100, in an exemplary embodiment, may be 1:0.5 to 1:50, in another exemplary embodiment, may be 1:1 to 1:30, and in still another exemplary embodiment, may be 1:1 to 1:10.

More specifically, the hydrogel fiber may be immersed in the water tank containing the basic aqueous solution in which the second aromatic monomer is dissolved and then gently shaken, and the immersion of the hydrogel fiber is performed at 10° C. to 50° C. for 10 minutes to 10 hours, and in an exemplary embodiment, the immersion time may be 1 hour to 5 hours, and in another exemplary embodiment, may be 1 hour to 3 hours.

The second aromatic monomer is infiltrated into the pores of the hydrogel fiber by the immersion process to be polymerized in the pores, and when the immersion time is satisfied, a tensile strength of the graphene-based carbon fiber manufactured from the graphene-based liquid crystal fiber may be abruptly increased.

Within the range of immersion temperature and time, pores, a free volume, defects, and the like of the hydrogel fiber may be filled with the second aromatic polymer, thereby forming a dense fiber structure to greatly improve mechanical physical properties.

A pH of the basic aqueous solution in which the second aromatic monomer is dissolved may be 7.0 or more, specifically 7.0 to 14, more specifically 7.5 to 12, and more specifically in a range of 8.0 to 10. The basic aqueous solution may include a buffer solution, which may be selected from known buffer solutions such as Tris-HCl and a phosphate buffer solution, and in an exemplary embodiment, may be a Tris-HCl buffer solution, but not limited thereto.

The second aromatic polymer produced by the oxidation polymerization may be a water-insoluble hydrophilic phenolic polymer. As the phenolic compound containing an amine group as the second aromatic monomer is polymerized, the aromatic ring of the structural unit of the main chain has low water solubility so as not to be dissolved in water, and due to the water-insoluble property, the pores between the graphene composites forming the hydrogel fiber may be stably filled. When the first aromatic polymer is the water-insoluble hydrophilic phenolic polymer, and the second aromatic polymer is also the water-insoluble hydrophilic phenolic polymer, the first aromatic polymer and the second aromatic polymer form a hydrogen bond and a n-n interaction with each other, thereby allowing higher densification of the hydrogel fiber and formation of a dense texture.

More specifically, as an example, when the second aromatic monomer is dopamine, the dopamine may form a polydopamine which is the second aromatic polymer by self-polymerization in a basic pH range, and the polydopamine may stably fill the pores between the graphene composites forming the hydrogel fiber.

For example, when both of the first aromatic polymer and the second aromatic polymer are polydopamine, the polydopamine forming a coating layer on the graphene oxide which corresponds to the first aromatic polymer and the polydopamine which corresponds to the second aromatic polymer may form a n-n interaction with each other by a catechol group of the polydopamine, and at the same time, may form a hydrogen bond between hydroxyl groups of the catechol group. The polydopamine which is the second aromatic polymer in the hydrogel fiber may be filled with a high density by the strong interaction between the polydopamines as the above, and the hydrogel fiber may form a dense texture.

The second aromatic polymer may be physically bonded to the first aromatic polymer by a n-n interaction and a hydrogen bond during the filling process of the pores of the hydrogel fiber, or the second aromatic monomer may be oxidatively polymerized to be chemically bonded to the first aromatic polymer by a covalent bond.

In the manufacturing method of a graphene-based liquid crystal fiber according to another exemplary embodiment of the present invention, step (c) may include filling the pores of the hydrogel fiber with the second aromatic polymer.

The second aromatic polymer refers to a polymer prepared by previously polymerizing the second aromatic monomer, and an aqueous high molecular solution of the second aromatic polymer dissolved in an appropriate solvent is prepared, and then the hydrogel fiber is immersed in the aqueous high molecular solution, thereby filling the pores of the hydrogel fiber with the second aromatic polymer. As such, the hydrogel fiber is filled with the second aromatic polymer, thereby manufacturing the graphene-based liquid crystal fiber.

After the filling step of step (c), a step of washing and drying the graphene-based liquid crystal fiber may be further included. For washing the graphene-based liquid crystal fiber, the graphene-based liquid crystal fiber is continuously washed with distilled water to remove a content of residual ions to an allowable value or less.

For drying of the graphene-based liquid crystal fiber, drying may be performed for 10 minutes to 6 hours, and the temperature range of drying may be 20 to 80° C., but the drying conditions are not particularly limited as long as the solvent in the hydrogel fiber is evaporated under the condition.

In an exemplary embodiment of the present invention, the graphene-based liquid crystal fiber which is highly densified and has a dense texture by the manufacturing method of a graphene-based liquid crystal fiber as described above, is provided, and the graphene-based liquid crystal fiber may be used as a precursor for manufacturing a graphene-based carbon fiber.

The graphene-based liquid crystal fiber according to an exemplary embodiment of the present invention includes a hydrogel fiber manufactured by wet-spinning a graphene-based compound modified with a first aromatic polymer and a second aromatic polymer filled in the pores of the hydrogel fiber.

In the graphene-based liquid crystal fiber according to an exemplary embodiment of the present invention, the first aromatic polymer and the second aromatic polymer included in the graphene-based liquid crystal fiber may be a phenolic compound containing a nitrogen atom in the structural unit, and as the phenolic compound containing the nitrogen atom in the structural unit is included in the main chain, the graphene-based carbon fiber produced by a carbonization step may have an excellent operational effect in mechanical strength and electrical conductivity, as described below.

As a specific example, when the first aromatic polymer and the second aromatic polymer are polydopamine, the nitrogen atom is contained in a heterocycle, and the phenol type heterocycle is included in the main chain, thereby forming an indole or indoline type structure. The structure in the form of the phenol type heterocycle may be converted into the graphene-based carbon fiber by a carbonization step in the state of being bonded to the graphene-based compound, and the nitrogen in the phenol type heterocycle may be converted into graphitic nitrogen to contribute to significant improvement of electrical conductivity in the graphene-based carbon fiber.

In the graphene-based liquid crystal fiber according to an exemplary embodiment of the present invention, $I_D/I_G$ of the graphene composite included in the graphene-based liquid crystal fiber may satisfy the following Equation 1:

$$(I_D/I_G)_G/(I_D/I_G)_C > 1 \qquad \text{[Equation 1]}$$

wherein $I_D/I_G$ is a measure of relative crystallinity which represents density of defects, and is calculated as a ratio of a maximum intensity value of a peak of an absorption region at $1350\pm10$ cm$^{-1}$ ($I_D$) to a maximum intensity value of a peak of an absorption region at $1590\pm10$ cm$^{-1}$ ($I_G$), in Raman spectroscopic analysis, $(I_D/I_G)_G$ refers to $I_D/I_G$ of the graphene-based compound, and $(I_D/I_G)_C$ refers to $I_D/I_G$ of a graphene composite modified with the first aromatic polymer.

As defined in the above Equation 1, $I_D/I_G$ of the graphene composite may have a smaller value than $I_D/I_G$ of the graphene-based compound. The graphene-based compound includes various polar functional groups containing an oxygen atom to have many defects, and the graphene-based compound having the defects may represent a high $I_D/I_G$ value. However, as the first aromatic polymer is surface-polymerized on the graphene-based compound, the polar functional group of the graphene-based compound and the first aromatic polymer are covalently bonded, thereby reducing the polar functional group to heal the defects, and thus, the $I_D/I_G$ value may be decreased to a smaller value.

In addition, $(I_D/I_G)_C$ of the graphene composite modified with the first aromatic polymer may be 1 or less, and more specifically 0.7 or more and 0.9 or less.

In the graphene-based liquid crystal fiber according to an exemplary embodiment of the present invention, adhesion of the graphene composite included in the graphene-based liquid crystal fiber may satisfy the following Equation 2:

$$F_C/F_G > 2 \qquad \text{[Equation 2]}$$

wherein $F_G$ refers to adhesion between the graphene-based compounds, and Fe refers to adhesion of the graphene composite modified with the first aromatic polymer. Specifically, $F_C/F_G$ may be 2.5 or more, and more specifically a value of 3 or more and 5 or less.

As the graphene composite has high adhesion to each other as compared with the adhesion between the graphene-based compounds, pores, a free volume, defects, and the like inside the graphene-based liquid crystal fiber are decreased to form a denser fiber structure. However, since the graphene-based compounds have low adhesion to each other, even in the case that the graphene-based compound is spun into the graphene-based liquid crystal fiber, defects of the fiber arising from a folding and wrinkling phenomenon of the graphene-based compound may occur by electrical repulsive force between polar functional groups, and a structure having pores developed may be represented.

In the graphene-based liquid crystal fiber according to an exemplary embodiment of the present invention, a weight ratio of the graphene-based compound to the first aromatic polymer may be 1:0.01 to 1:10, in an exemplary embodiment, may be 1:0.05 to 1:5, in another exemplary embodiment, may be 1:0.1 to 1:1, and in still another exemplary embodiment, may be 1:0.1 to 1:0.5.

In addition, a weight ratio of the graphene composite to the second aromatic polymer may be 1:0.1 to 1:100, in an exemplary embodiment, may be 1:0.5 to 1:50, in another exemplary embodiment, may be 1:1 to 1:30, and in still another exemplary embodiment, may be 1:1 to 1:10.

In various embodiments of the present invention, a manufacturing method of a graphene-based carbon fiber is provided, and the manufacturing method of a graphene-based carbon fiber according to an exemplary embodiment of the present invention includes: (a) polymerizing a first aromatic monomer on a graphene-based compound to prepare a graphene composite in which a first aromatic polymer is surface-polymerized on the graphene-based compound; (b) wet-spinning the graphene composite to manufacture a hydrogel fiber; (c) filling pores of the hydrogel fiber with a second aromatic polymer to manufacture a graphene-based liquid crystal fiber; and (d) carbonizing the graphene-based liquid crystal fiber.

The graphene-based carbon fiber is manufactured by further performing a step of carbonizing the graphene-based liquid crystal fiber manufactured by the manufacturing method of a graphene-based liquid crystal fiber as described above, and by carbonizing the graphene-based liquid crystal fiber to form a carbon fiber, excellent mechanical physical properties and electrical conductivity may be exhibited.

In the manufacturing method of a graphene-based carbon fiber according to an exemplary embodiment of the present invention, the carbonization step of step (d) may be performed under an inert gas or reducing gas atmosphere at high temperature.

A carbonization temperature in the carbonization step may be 600 to 2000° C., and specifically 800 to 1500° C.

The gas atmosphere may be the inert gas atmosphere such as nitrogen and argon or the reducing gas atmosphere containing hydrogen, and in an exemplary embodiment, may be the reducing gas atmosphere containing hydrogen. In the carbonization step, heating may be performed at a heating rate of 0.5 to 5° C./min, and specifically 1 to 3° C./min to a final carbonization temperature, and the carbonization may be performed by maintaining the final carbonization temperature for 1 hour to 5 hours, but this is only an example, and not limited thereto.

Before performing the carbonization step, a step of continuously flowing the inert gas or reducing gas into the graphene-based liquid crystal fiber may be further included for removing residual moisture and air therefrom.

In an exemplary embodiment of the present invention, the graphene-based carbon fiber which is highly densified and has a dense texture by the manufacturing method of a graphene-based carbon fiber as described above is provided, and the graphene-based carbon fiber is characterized by having a dense texture which does not substantially include pores in the fiber.

Specifically, the first aromatic polymer and the second aromatic polymer included in the graphene-based liquid crystal fiber may be converted into a structure like nitrogen-doped graphene by the carbonization step, and accordingly, a graphitic nitrogen content in the graphene-based carbon fiber may be increased to significantly improve electrical conductivity of the graphene-based carbon fiber.

The graphene-based carbon fiber according to an exemplary embodiment of the present invention includes the graphene-based compound and the graphitic nitrogen, and may have an electrical conductivity of $1 \times 10^4$ S/m or more, in an exemplary embodiment, may be $5 \times 10^4$ S/m or more, and in another exemplary embodiment, may be $1 \times 10^5$ S/m or more and $1 \times 10^6$ S/m or less.

The graphene-based carbon fiber may contain 0.1 atom % to 20 atom %, specifically 0.5 atom % to 15 atom %, and more specifically 1 atom % to 12 atom % of the graphitic nitrogen. In an exemplary embodiment, the graphene-based carbon fiber may contain 2 atom % to 10 atom % of the graphitic nitrogen, and within the range of the graphitic nitrogen, the graphene-based carbon fiber may represent excellent electrical conductivity.

The graphene-based carbon fiber may have an average long axis diameter of 1 μm to 1000 μm, specifically 5 to 500 μm, and more specifically 10 to 100 μm, but limited thereto.

The inside of the graphene-based carbon fiber may be formed of a dense texture which substantially does not include pores. As the pores are not substantially included, mechanical strength and electrical conductivity may be significantly improved as compared with the conventional carbon fiber. Pores being not substantially included in the inside of the graphene-based carbon fiber means that there are no visually observable pores when a section of the carbon fiber is observed by a scanning electron microscope at 3,000 to 4,000 times, and specifically means that there are no pores of 100 nm or more in the section of the graphene-based carbon fiber.

In the mechanical strength of the graphene-based carbon fiber, a tensile strength may be 300 MPa or more, in an exemplary embodiment, may be 500 MPa or more, and in another exemplary embodiment, may be 600 MPa or more and 800 MPa or less.

When the carbon fiber or graphene-based carbon fiber undergoes the carbonization step to include many pores and defects in an axis direction of the carbon fiber due to shrinkage of fiber, even in the case of containing a nitrogen atom, a trace amount of a graphitic nitrogen is contained in the carbon fiber, and thus, the electrical conductivity and the tensile strength of the carbon fiber are both low or needs trade-off. However, the graphene-based carbon fiber according to an exemplary embodiment of the present invention is formed of a dense texture which does not substantially include pores in the inside, and as the graphitic nitrogen is contained in a large amount, the electrical conductivity and the tensile strength may be both significantly improved to the range as described above.

In another exemplary embodiment of the present invention, the manufacturing method of a graphene liquid crystal fiber according to an exemplary embodiment of the present invention includes: (a) wet-spinning a graphene-based compound to manufacture a graphene-hydrogel fiber, and (b) polymerizing an aromatic monomer on the graphene-hydrogel fiber to fill pores of the graphene-hydrogel fiber with an aromatic polymer to manufacture the graphene liquid crystal fiber.

In step (a) of the manufacturing method of a graphene liquid crystal fiber, the graphene-based compound may be in a suspension state in which the graphene-based material is dispersed in an aqueous solution, as described above, and for improving dispersibility and compatibility in the aqueous solution, the graphene-based material may be graphene oxide (GO). Hereinafter, the graphene oxide is as described above, and further description thereof will be omitted.

The graphene-based compound may be in a state of being dispersed in an aqueous solution, and may be a graphene oxide dispersion from which impurities such as ionic impurities were removed by a known means. In an exemplary embodiment, the graphene oxide dispersion may represent a liquid crystal state in an aqueous solution.

The aromatic monomer may be a phenolic compound containing an amine group. For example, the phenolic compound containing an amine group may include a compound represented by the following Chemical Formula 1 or a salt thereof:

[Chemical Formula 1]

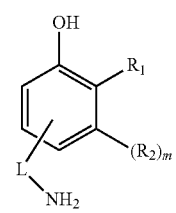

wherein $R_1$ is any one selected from the group consisting of hydrogen, hydroxy, carboxylic acid, and salts thereof;

$R_2$ is independently of each other any one or a combination of two or more selected from the group consisting of (C1-C10)alkyl, (C1-C10)alkenyl, (C3-C20)cycloalkyl, (C3-C20)heterocycloalkyl, (C6-C20)aryl, (C3-C20)heteroaryl, nitro, cyano, —C(=O)$R_{11}$, and —C(=O)O$R_{12}$;

$R_{11}$ and $R_{12}$ are independently of each other any one or a combination of two or more selected from the group consisting of hydrogen, (C1-C10)alkyl, (C3-C20)cycloalkyl, (C3-C20)heterocycloalkyl, (C6-C20)aryl, and (C3-C20)heteroaryl;

L is a divalent linking group;

m is an integer of 1 to 3;

when m is 2 or more, $R_2$ may be connected to an adjacent substituent to form a ring; and when alkyl, alkenyl, cycloalkyl, heterocycloalkyl, aryl, or heteroaryl of $R_2$, $R_{11}$, and $R_{12}$ may be independently of each other substituted by any one or more substituents selected from the group consisting of hydroxy, carboxylic acid, (C1-C10)alkoxy, (C1-C10)alkyl carbonyl, a halogen, amine, cyano, nitro, and salts thereof.

In Chemical Formula 1, L may be an optional divalent linking group may, may be bonded to an optional position of a phenol ring, and in an exemplary embodiment, may be bonded at a para position. The alkyl, alkenyl, and alkoxy includes all forms of straight chains and branched chains.

Meanwhile, when two or more substituents are combined, it means that two or more substituents are covalently bonded to each other, and as an example, when (C1-C10)alkyl and (C6-C20)aryl are combined, it means that they have a structure of *—(C1-C10)alkyl-(C6-C20)aryl or *—(C6-C20)aryl-(C1-C10)alkyl.

The phenolic amine is a hydrophilic monomer containing one or more hydroxyl groups in the molecule and has excellent solubility in an aqueous solution as a medium, thereby causing oxidation polymerization. Accordingly, the phenolic amine may form a phenolic polymer as the first aromatic monomer on a surface of the graphene compound to produce the graphene composite by oxidation polymerization.

In the compound represented by Chemical Formula 1, $R_1$ is hydrogen or hydroxy; L is (C1-C10)alkylene or (C1-C10)alkenylene, —$CH_2$— of the alkylene or alkenylene may be replaced with any one selected from the group consisting of —$N(R_{13})$—, —C(=O)NH—, —C(=O)O—, and —O—, $R_{13}$ may be any one selected from the group consisting of hydrogen, (C1-C10)alkyl and amino(C1-C10)alkyl, and the alkylene and alkenylene of L may be further substituted by any one or more substituents selected from the group consisting of a halogen, hydroxy, amine, carboxylic acid, (C1-C10)alkoxy, (C1-C10)alkylcarbonyl, and salts thereof.

When L is substituted by any one or more substituents selected from the group consisting of a halogen, hydroxy, amine, carboxylic acid, (C1-C10)alkoxy, (C1-C10)alkylcarbonyl, and salts thereof, it means that the hydrogen atom of alkylene or alkenylene is substituted by the substituents.

Specifically, L is (C1-C6)alkylene or (C1-C6)alkenylene, —$CH_2$— of the alkylene or alkenylene may be replaced with any one selected from the group consisting of —$N(R_{13})$—, —C(=O)NH—, —C(=O)O—, and —O—, and $R_{13}$ may be any one selected from the group consisting of (C1-C6)alkyl and amino(C1-C6)alkyl. The alkylene and alkenylene of L may be further substituted by one or more substituents selected from the group consisting of a halogen, hydroxy, amine, carboxylic acid, (C1-C6)alkoxy, (C1-C6)alkylcarbonyl, and salts thereof.

$R_2$ is independently of each other any one or a combination of two or more selected from the group consisting of (C1-C6)alkyl, (C1-C6)alkenyl, (C3-C10)cycloalkyl, (C3-C10)heterocycloalkyl, (C6-C10)aryl, (C3-C10)heteroaryl, nitro, cyano, —C(=O)$R_{11}$, and —C(=O)O$R_{12}$; the alkyl, alkenyl, cycloalkyl, heterocycloalkyl, aryl, or heteroaryl of $R_2$, $R_{11}$, and $R_{12}$ may be independently of each other substituted by any one or more substituents selected from the group consisting of hydroxy, carboxylic acid, (C1-C10)alkoxy, (C1-C10)alkylcarbonyl, a halogen, amine, cyano, nitro, and salts thereof.

Specifically, L is (C1-C3)alkylene, —$CH_2$— of the alkenylene may be replaced with any one selected from the group consisting of —$N(R_{13})$—, —C(=O)NH—, —C(=O)O—, and —O—, and $R_{13}$ may be any one selected from the group consisting of (C1-C3)alkyl and amino(C1-C3)alkyl. Here, the alkylene and alkylene of L may be further substituted by one or more substituents selected from the group consisting of hydroxy, amine, carboxylic acid, and salts thereof.

$R_2$ is independently of each other any one or a combination of two or more selected from the group consisting of (C1-C6)alkyl, (C1-C6)alkenyl, (C3-C10)cycloalkyl, (C3-C10)heterocycloalkyl, (C6-C10)aryl, and (C3-C10)heteroaryl; the alkyl, alkenyl, cycloalkyl, heterocycloalkyl, aryl, or heteroaryl of $R_2$ may be independently of each other substituted by any one or more substituents selected from the group consisting of hydroxy, carboxylic acid, (C1-C10)alkoxy, (C1-C10)alkylcarbonyl, a halogen, amine, and salts thereof.

Specifically, the phenolic amine may be any one or a mixture of two or more selected from the group consisting of tyramine, dopamine quinone, dopamine, α-methyl dopamine, norepinephrine, epinephrine, α-methyldopa, indolamine, serotonin, 5-hydroxydopamine, and salts thereof, and in an exemplary embodiment, may be dopamine or a dopamine salt, but not limited thereto.

In the manufacturing method of a graphene liquid crystal fiber, step (a) includes wet-spinning the graphene-based compound to manufacture a graphene-hydrogel fiber. The step of manufacturing the graphene-hydrogel fiber may be pressurizing the graphene-based compound to be spun into a solidification bath by a spinneret. The wet-spun graphene-hydrogel fiber is solidified in the solidification bath by a solidification solution, and as a solvent in the graphene-based compound is diffused into the solidification bath to proceed with solidification and be leached, the graphene-hydrogel fiber may be formed.

According to an exemplary embodiment of the present invention, any solidification solution may be used without limitation as long as the solidification solution solidifies the wet-spun graphene-based compound. For example, the solidification solution may be any one or a combination of two or more selected from the group consisting of an aqueous solution containing alkaline earth metal ions, an aqueous solution containing polyvalent metal ions, alcohol-based solvent, ketone-based solvent, ester-based solvent, ether-based solvent, and amine-based solvent. Specifically, the solidification solution may be any one or a mixture of two or more selected from the group consisting of an aqueous calcium chloride ($CaCl_2$) solution, an aqueous magnesium chloride solution, methanol, ethanol, methoxyethanol, propanol, isopropanol, butanol, isobutanol, acetone, methylethylketone, methylisobutylketone, ethyl acetate, butyl acetate, 3-methoxy-3-methylbutyl acetate, dimethyl formamide, methyl pyrrolidone, dimethyl acetamide, tetrahydrofuran, 2-methyltetrahydrofuran, dimethylether, dibutylether, and the like, but not limited thereto.

When the aqueous solution containing alkaline earth metal ions or polyvalent metal ions is used as the solidification solution, a concentration of the alkaline earth metal salt may be 0.1 to 20 wt %, and specifically 1 to 10 wt %.

According to an exemplary embodiment of the present invention, the graphene-hydrogel fiber may be manufactured by a spun fiber which is drawn by rotating the solidification bath during wet-spinning. The rotational speed may be 1 to 100 rpm, but not limited thereto. From the spun fiber which is spun by rotating the solidification bath at the rotational speed, the drawn graphene-hydrogel fiber may be manufactured. The drawn graphene-hydrogel fiber may have a draw ratio of 1.1 to 3 times, and specifically 1.2 to 2 times, and at the draw ratio, the drawn hydrogel fiber may have high liquid crystal orientation and mechanical properties.

An inner diameter of a nozzle in wet spinning may be 50 μm to 1000 μm, and more specifically 100 μm to 500 μm, but not limited thereto. Due to the inner diameter of the nozzle, the manufactured graphene-hydrogel fiber may also have an average long axis diameter of 50 μm to 1000 μm, and more specifically 100 μm to 500 μm.

According to an exemplary embodiment of the present invention, since the spinning temperature and the spinning speed of the spinning solution have been described above in the manufacturing method of a graphene-based liquid crystal fiber, description thereof will be omitted.

In the manufacturing method of a graphene liquid crystal fiber according to an exemplary embodiment of the present invention, step (b) may include polymerizing an aromatic monomer on the graphene-hydrogel fiber to fill pores of the graphene-hydrogel fiber with an aromatic polymer to manufacture the graphene liquid crystal fiber.

As such, the aromatic monomer is infiltrated into the pores of the graphene-hydrogel fiber to fill the graphene-hydrogel fiber with the aromatic polymer, thereby manufacturing the graphene liquid crystal fiber.

The aromatic monomer may be a phenolic compound containing an amine group. For example, the phenolic compound containing an amine group may include a compound represented by Chemical Formula 1 or a salt thereof, as described above.

Specifically, the phenolic compound may be any one or a mixture of two or more selected from the group consisting of tyramine, dopamine quinone, dopamine, α-methyl dopamine, norepinephrine, epinephrine, α-methyldopa, indolamine, serotonin, 5-hydroxydopamine, and salts thereof, and in an exemplary embodiment, may be dopamine or a dopamine salt, but not limited thereto.

The step of filling the pores of the graphene-hydrogel fiber with the aromatic polymer may be immersing the graphene-hydrogel fiber in a water tank containing a basic aqueous solution in which the aromatic monomer is dissolved, and infiltrating the aromatic monomer into the graphene-hydrogel fiber.

That is, the aromatic monomer may be polymerized by adding the aromatic monomer in a state of being dissolved in the basic aqueous solution to the graphene-hydrogel fiber, and the oxidation polymerization of the aromatic monomer is initiated in the basic aqueous solution. That is, the aromatic monomer may be polymerized into the aromatic polymer by pH-induced self-polymerization, and filled into the pores of the graphene-hydrogel fiber.

A weight ratio of the graphene-based compound to the aromatic monomer forming the graphene-hydrogel fiber may be 1:0.1 to 1:100, in an exemplary embodiment, may be 1:0.5 to 1:50, in another exemplary embodiment, may be 1:1 to 1:30, and in still another exemplary embodiment, may be 1:1 to 1:10.

More specifically, the graphene-hydrogel fiber may be immersed in the water tank containing the basic aqueous solution in which the aromatic monomer is dissolved and then gently shaken, and the immersion of the graphene-hydrogel fiber is performed at 10° C. to 50° C. for 10 minutes to 10 hours, and in an exemplary embodiment, the immersion time may be 1 hour to 5 hours, and in another exemplary embodiment, may be 1 hour to 3 hours.

The aromatic monomer is infiltrated into the pores of the graphene-hydrogel fiber by the immersion process to be polymerized in the pores, and when the immersion time is satisfied, a tensile strength of the graphene carbon fiber manufactured from the graphene liquid crystal fiber may be abruptly increased.

Within the range of immersion temperature and time, pores, a free volume, defects, and the like of the graphene-hydrogel fiber may be filled with the aromatic polymer, thereby forming a dense fiber structure to greatly improve mechanical physical properties.

A pH of the basic aqueous solution in which the aromatic monomer is dissolved may be 7.0 or more, specifically 7.0 to 14, more specifically 7.5 to 12, and more specifically in a range of 8.0 to 10. The basic aqueous solution may include a buffer solution, which may be selected from known buffer solutions such as Tris-HCl and a phosphate buffer solution, and in an exemplary embodiment, may be a Tris-HCl buffer solution, but not limited thereto.

The aromatic polymer produced by the oxidation polymerization may be a water-insoluble hydrophilic phenolic polymer. As the phenolic compound containing an amine group as the aromatic monomer is polymerized, the aromatic ring of the structural unit of the main chain has low water solubility so as not to be dissolved in water, and due to the water-insoluble property, the pores between the graphene-based compounds forming the graphene-hydrogel fiber may be stably filled.

More specifically, as an example, when the aromatic monomer is dopamine, the dopamine may form a polydopamine which is the aromatic polymer by self-polymerization in a basic pH range, and the polydopamine may stably fill the pores between the graphene-based compounds forming the graphene-hydrogel fiber.

In the manufacturing method of a graphene liquid crystal fiber according to another exemplary embodiment of the present invention, step (b) may include filling the pores of the graphene-hydrogel fiber with an aromatic polymer to manufacture the graphene liquid crystal fiber.

The aromatic polymer refers to a polymer prepared by previously polymerizing the aromatic monomer, and an aqueous high molecular solution of the aromatic polymer dissolved in an appropriate solvent is prepared, and then the graphene-hydrogel fiber is immersed in the aqueous high molecular solution, thereby filling the pores of the graphene-hydrogel fiber with the aromatic polymer. As such, the graphene-hydrogel fiber is filled with the aromatic polymer, thereby manufacturing the graphene liquid crystal fiber.

After the filling step of step (b), a step of washing and drying the graphene liquid crystal fiber may be further included. For washing the graphene liquid crystal fiber, the graphene liquid crystal fiber is continuously washed with distilled water to remove a content of residual ions to an allowable value or less.

For drying of the graphene liquid crystal fiber, drying may be performed for 10 minutes to 6 hours, and the temperature range of drying may be 20 to 80° C., but the drying conditions are not particularly limited as long as the solvent in the hydrogel fiber is evaporated under the condition.

In an exemplary embodiment of the present invention, the graphene liquid crystal fiber which is highly densified and has a dense texture by the manufacturing method of a graphene liquid crystal fiber as described above is provided, and the graphene liquid crystal fiber may be used as a precursor for manufacturing a graphene carbon fiber.

The graphene liquid crystal fiber according to an exemplary embodiment of the present invention includes a graphene-hydrogel fiber manufactured by wet-spinning a graphene-based compound and the aromatic polymer filled in the pores of the graphene-hydrogel fiber.

In the graphene liquid crystal fiber according to an exemplary embodiment of the present invention, the aromatic polymer included in the graphene-based liquid crystal fiber may be a phenolic compound containing a nitrogen atom in the structural unit, and as the phenolic compound containing the nitrogen atom in the structural unit is included in the main chain, the graphene carbon fiber produced by a carbonization step may have an excellent operational effect in mechanical strength and electrical conductivity, as described below.

As a specific example, when the aromatic polymer is polydopamine, the nitrogen atom is contained in a phenol type heterocycle, and the phenol type heterocycle is included in the main chain, thereby forming an indole or indoline type structure. The structure in the form of the phenol type heterocycle may be converted into the graphene carbon fiber by a carbonization step in a state of being bonded to the graphene-based compound, and the nitrogen in the phenol type heterocycle may be converted into graphitic nitrogen to contribute to significant improvement of electrical conductivity in the graphene carbon fiber.

A weight ratio of the graphene-based compound to the aromatic polymer may be 1:0.1 to 1:100, in an exemplary embodiment, may be 1:0.5 to 1:50, in another exemplary embodiment, may be 1:1 to 1:30, and in still another exemplary embodiment, may be 1:1 to 1:10.

In another exemplary embodiment of the present invention, the manufacturing method of a graphene carbon fiber according to an exemplary embodiment of the present invention includes: (a) wet-spinning a graphene-based compound to manufacture a graphene-hydrogel fiber, (b) polymerizing an aromatic monomer on the graphene-hydrogel fiber to fill pores of the graphene-hydrogel fiber with an aromatic polymer to manufacture the graphene liquid crystal fiber, and (c) carbonizing the graphene liquid crystal fiber.

The graphene carbon fiber is manufactured by further performing a step of carbonizing the graphene liquid crystal fiber manufactured by the manufacturing method of a graphene liquid crystal fiber as described above, and by carbonizing the graphene liquid crystal fiber to form a carbon fiber, excellent mechanical physical properties and electrical conductivity may be exhibited.

In the manufacturing method of a graphene carbon fiber according to an exemplary embodiment of the present invention, the carbonization step of step (c) may be performed under an inert gas or reducing gas atmosphere at high temperature.

A carbonization temperature in the carbonization step may be 600 to 2000° C., and specifically 800 to 1500° C. The gas atmosphere may be the inert gas atmosphere such as nitrogen and argon or the reducing gas atmosphere containing hydrogen, and in an exemplary embodiment, may be the reducing gas atmosphere containing hydrogen. In the carbonization step, heating may be performed at a heating rate of 0.5 to 5° C./min, and specifically 1 to 3° C./min to a final carbonization temperature, and the carbonization may be performed by maintaining the final carbonization temperature for 1 hour to 5 hours, but this is only an example, and not limited thereto.

Before performing the carbonization step, a step of continuously flowing the inert gas or reducing gas into the graphene liquid crystal fiber may be further included for removing residual moisture and air therefrom.

In an exemplary embodiment of the present invention, the graphene carbon fiber which is highly densified and has a dense texture by the manufacturing method of a graphene carbon fiber as described above, is provided, and the graphene carbon fiber is characterized by having a dense texture which substantially hardly includes pores in the fiber.

Specifically, the aromatic polymer included in the graphene liquid crystal fiber may be converted into a structure like nitrogen-doped graphene by the carbonization step, and accordingly, a graphitic nitrogen content in the graphene carbon fiber may be increased to significantly improve electrical conductivity of the graphene carbon fiber.

The graphene carbon fiber according to an exemplary embodiment of the present invention includes the graphene-based compound and the graphitic nitrogen, and may have an electrical conductivity of $1 \times 10^4$ S/m or more, and in an exemplary embodiment, the electrical conductivity may be $2 \times 10^4$ S/m or more, and in another exemplary embodiment, may be $3 \times 10^4$ S/m or more and $5.1 \times 10^4$ S/m or less.

The graphene carbon fiber may contain 0.1 atom % to 20 atom %, specifically 0.5 atom % to 15 atom %, and more specifically 1 atom % to 10 atom % of the graphitic nitrogen. In an exemplary embodiment, the graphene carbon fiber may contain 1 atom % to 10 atom % of the graphitic nitrogen, and within the range of the graphitic nitrogen, the graphene-based carbon fiber may represent excellent electrical conductivity.

The graphene carbon fiber may have an average long axis diameter of 1 μm to 1000 μm, specifically 5 to 500 μm, and more specifically 10 to 100 μm, but limited thereto.

Hereinafter, the present invention will be described in more detail with reference to the Example and Comparative Examples. However, the following Example and Comparative Examples are only an example for describing the present invention in detail, and do not limit the present invention in any way.

1. Evaluation of Liquid Crystallinity

The liquid crystallinity of the graphene composite according to the Preparation Example was observed using a polarizing microscope (Leitz-Laborlux 12 pol S). Each of the compounds was placed between vertically crossed polarizing plates, the polarizing axis was rotated at 00 and 900, respectively, and horizontal polarized light was transmitted to observe a polarizing property.

2. Evaluation of Degree of Orientation

A degree of orientation of the graphene-based liquid crystal fiber was obtained by aligning a bundle of fiber and performing calculation by the following equation through wide-angle X-ray scattering (WAXS, D/MAX-2500, Rigaku) analysis.

$$\text{Degree of orientation} = (180° - \Delta\Phi)/180°$$

a full width at half-maximum intensity (FWHM) of a peak representing a crystal orientation property with $\Delta\Phi$ azimuthal scanning.

3. Evaluation of Adhesion

The surface shape of the graphene-based compound and the graphene composite according to the Preparation Example was observed using an atomic force microscope (Innova, Bruker, USA) of a tapping mode.

The graphene-based compound and the graphene composite were surface-treated on an AFM tip, and average adhesion of each of the surface-treated AFM tips to the graphene-based compound and the graphene composite was analyzed by a pull-off test using an atomic force microscope (AFM). A force constant using a Si cantilever was 0.2 N/m, and a force of 115.47 μN was applied at an approach and retraction speed of 1 μm/sec which is repeated 10 times, thereby obtaining values, and from these values, average adhesion was determined. A surface treatment solution was prepared on the AFM tip by diluting the graphene-based compound and the graphene composite at a concentration of 0.25 mg/ml, an effect of a contact area on the sharp Si tip surface was minimized to control the thickness in a range of 40 to 50 nm for conformal coating, and the AFM tip on which the graphene-based compound and the graphene composite are surface-treated was soaked in ion exchange water for 30 minutes or more and pulling force was measured immediately.

4. Analysis of Crystallinity

The graphene-based compound and the graphene composite according to the Preparation Example were analyzed by irradiating light at 514 nm using Raman spectroscopy (ARAMIS, Horiba Jobin-Yvon, France). A G peak (graphite peak) was a graphite crystal structure, and a D peak was related to an amorphous state of a carbon structure of carbon atoms. The relative crystallinity was confirmed depending on the intensity of two regions ($I_D/I_G$)

5. Analysis of Functional Group

The graphene-based compound and the graphene composite according to the Preparation Example were analyzed using ATR-FTIR (IFS66V/S & HYPERION 3000, Bruker Optiks, Germany), by an infrared absorption spectroscopic analysis.

6. Elemental Analysis

The graphene-based compound and the graphene composite according to the Preparation Example were analyzed using Sigma Probe (Theremo VG Scientific) by X-ray photoelectron spectroscopy.

7. Observation of Section

The sections of the fiber, the hydrogel fiber, and the graphene-based liquid crystal fiber manufactured by wet-spinning the graphene-based compounds prepared according to the Example and the Comparative Examples were observed with a scanning electron microscope (SEM, Hitachi S 4800).

8. Observation of Section and Elemental Analysis

For the sections of the fiber and the hydrogel fiber manufactured by wet-spinning the graphene-based compound according to the Example and the Comparative Examples, and the fiber and the graphene-based liquid crystal fiber manufactured by wet-spinning the graphene-based compound filled with the second aromatic polymer, a high resolution transmission electron microscope (HF-TEM) image was observed with a high-angle annular dark-field imaging (HAADF), and with energy dispersive X-ray spectroscopy (EDS) for the same region, and elemental mapping was performed using Titan cubed G2 60-300 (FEI company) operating at 80 V. Each sample was prepared at a thickness of 20 nm using ultra-microtome.

9. Mechanical Properties

The mechanical properties of the carbon fiber manufactured according to the Example and the Comparative Examples were measured using a universal testing machine (UTM, Textechno FAVIMAT+, Germany). The resonant frequency of the fiber (gauge length: 10 nm) was measured in the state of pre-tension of 0.05 cN with an increase at an increase ratio of 0.05 cN. The measured tension value was converted based on a stress-strain curve.

10. Electrical Conductivity

The electrical conductivity of the carbon fibers according to the Example and the Comparative Examples was derived by measuring a resistance value using a two-point prove configuration system (HIOKI, card Hitester).

Preparation Example 1

Swellable graphite flakes (808113, Aldrich, Sigma Aldrich, 50 mesh) oxidized by a Hummers' method (modified Hummers' method) were dispersed in distilled water, and the ionic impurities in the prepared dispersion were removed by dialysis to prepare a dispersion in which a high-purity graphene oxide layer (<50 μm) is dispersed. The dispersion was centrifuged at a speed of 1800 rpm for 30 minutes to remove a supernatant, thereby preparing a graphene-based compound containing graphene oxide at a concentration of 1.5 wt %.

Preparation Example 2

5 mg of dopamine hydrochloride was added to 6 ml of a basic aqueous solution (10 mM Tris-HCl, pH 8.5), and ultrasonic treatment was performed for 10 minutes to prepare dopamine hydrochloride solution. The prepared solution was mixed with 4 ml of graphene oxide (5 mg/ml) of Preparation Example 1, and the mixture of the graphene oxide and the dopamine hydrochloride at a weight ratio of 1:4 was stirred at 25° C. for 30 minutes. Subsequently, ion exchange water was added for removing the basic aqueous solution in the mixture, centrifugation was performed at a speed of 18000 rpm for 30 minutes to remove a supernatant, and then the graphene composite containing the graphene oxide on the surface of which polydopamine was surface-polymerized at a concentration of 1.5 wt % was prepared.

Example 1

The graphene composite prepared in the Preparation Example 2 was spun by a wet-spinning process. First, the graphene composite was added to a syringe, and passed through a spinning nozzle having an inner diameter of 250 μm while an inflow rate of 0.12 ml/min was maintained, thereby being ejected to a solidification bath. The solidification bath was prepared by dissolving 5 wt % of calcium chloride ($CaCl_2$) in ion exchange water. During wet-spinning, the spinning nozzle was disposed 3 cm away from the solidification bath, and the solidification bath was rotated at a speed of 17 rpm to manufacture a hydrogel fiber having a draw ratio of 1.3 times. The ionic impurities in the fiber produced in the solidification step during the spinning process were removed by immersing the fiber in a bath containing ion exchange water. The hydrogel fiber from which the impurities were removed was soaked in a water tank filled with a basic aqueous solution (10 mM Tris-HCl, pH 8.5) to which 2 mg of dopamine hydrochloride was added, and then immersed therein at room temperature for 2 hours while gently shaking the water tank.

Both ends of the graphene-based liquid crystal fiber manufactured after immersion were fixed and dried at 25° C. for 6 hours. Subsequently, the collected fiber was positioned in a quartz tube for a carbonization process which was placed in a vacuum furnace at a pressure of 3.4×105 torr, and then 10 sccm of hydrogen gas was flowed thereinto for 30 minutes, thereby removing moisture and air absorbed in the fiber. The hydrogen gas was continuously flowed thereinto while heating was performed to 1000° C. at a heating rate of 2° C./min, and maintained for 2 hours. The temperature of the carbonization process was cooled to 25° C., and the graphene-based carbon fiber was manufactured.

Comparative Example 1

The graphene-based compound prepared in Preparation Example 1 was used to manufacture a wet-spun fiber by the same wet-spinning process as Example 1, and the ionic impurities in the fiber produced in the solidification step during the spinning process were removed by immersing the fiber in a bath containing ion exchange water. Both ends of the wet-spun fiber were fixed and dried at 25° C. for 6 hours, and the same carbonization process as Example 1 was performed to manufacture the carbon fiber.

Comparative Example 2

The graphene composite prepared in Preparation Example 2 was used to manufacture a wet-spun fiber by the same wet-spinning process as Example 1, and the ionic impurities in the fiber produced in the solidification step during the spinning process were removed by immersing the fiber in a bath containing ion exchange water. Both ends of the hydrogel fiber were fixed and dried at 25° C. for 6 hours, and the same carbonization process as Example 1 was performed to manufacture the carbon fiber.

Comparative Example 3

The carbon fiber was manufactured in the same manner as in Example 1, except that the graphene-based compound prepared in Preparation Example 1 was used.

Hereinafter, abbreviations in the present disclosure are as follows, and the transcription in the drawings are also as follows:
GO: graphene-based compound
DA: dopamine hydrochloride
PDA: polydopamine
DAGO: graphene composite
LGO: graphene-based compound
GF: carbon fiber of Comparative Example 1
PDA-GF1: carbon fiber of Comparative Example 2
PDA-GF2: carbon fiber of Comparative Example 3
PDA-GF12: graphene-based carbon fiber of Example 1

Experimental Example 1

The liquid crystallinity of the graphene composite prepared according to the ratio of the first aromatic monomer to the surface polymerization time was observed with a polarizing microscope. The graphene composites in which the dopamine hydrochloride and graphene oxide are mixed at weight ratios of 1:5, 1:4, and 1:2 were prepared in the same manner as in Preparation Example 2, and here, the mixing ratios of dopamine to graphene oxide in the graphene composite were 0.2, 0.25, and 0.5, respectively. The graphene composites prepared at the mixing ratios were observed with the polarizing microscope depending on the polymerization time of 30 minutes to 20 hours, thereby evaluating the liquid crystallinity.

Figure 2:
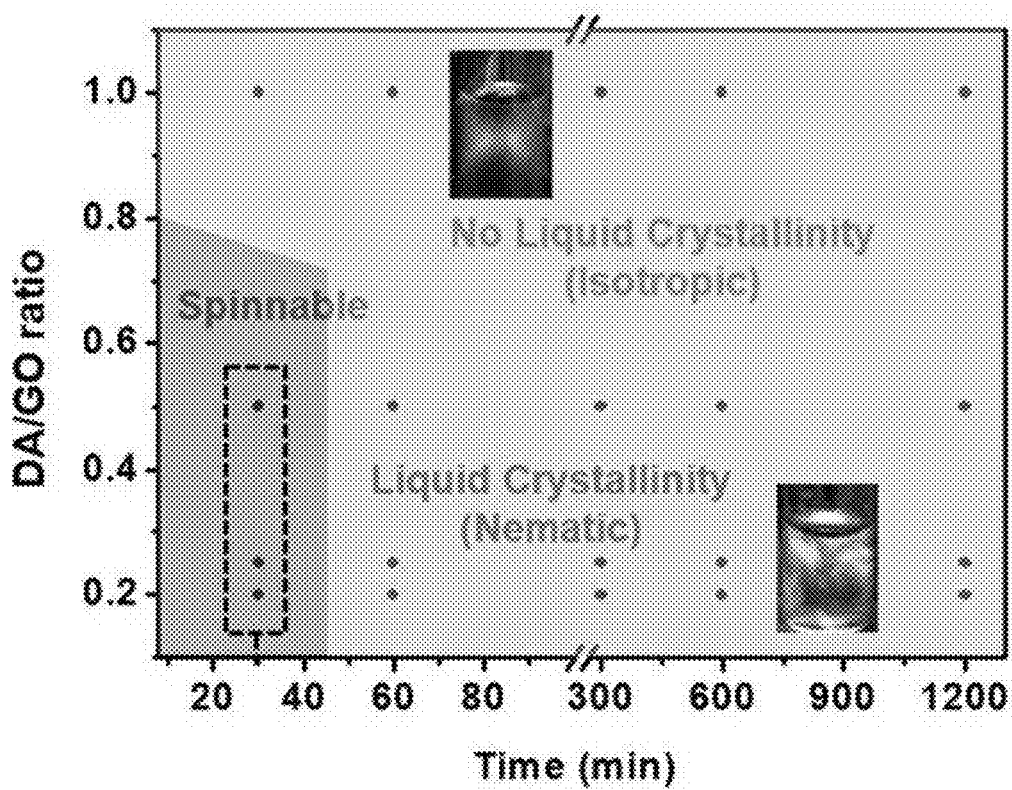
FIG. 2 is a graph representing a result of observing liquid crystallinity of the prepared graphene composite with a polarizing microscope, depending on a ratio of a first aromatic monomer according to an exemplary embodiment of the present invention and a surface polymerization time.

In FIG. 2, spinnable means that wet spinnability is excellent, and liquid crystallinity (nematic) means having a liquid crystal property with a nematic phase. In addition, no liquid crystallinity (isotropic) means isotropy which is not in a liquid crystal state.

As shown in FIG. 2, when a mixing ratio of dopamine hydrochloride to graphene oxide is 0.2 and 0.25, it was confirmed that the liquid crystallinity of the graphene composite was maintained for 10 hours, and when the mixing ratio was 0.5, it was confirmed that the liquid crystallinity was maintained for 1 hour.

As shown in FIG. 2, in a range of the mixing ratio depending on the weight ratio of dopamine hydrochloride and graphene oxide of 0.2 to 0.5, when the polymerization time is 30 minutes or less, it was confirmed that the graphene composite maintained a liquid crystal phase and showed excellent wet spinnability.

Experimental Example 2

Figure 3:
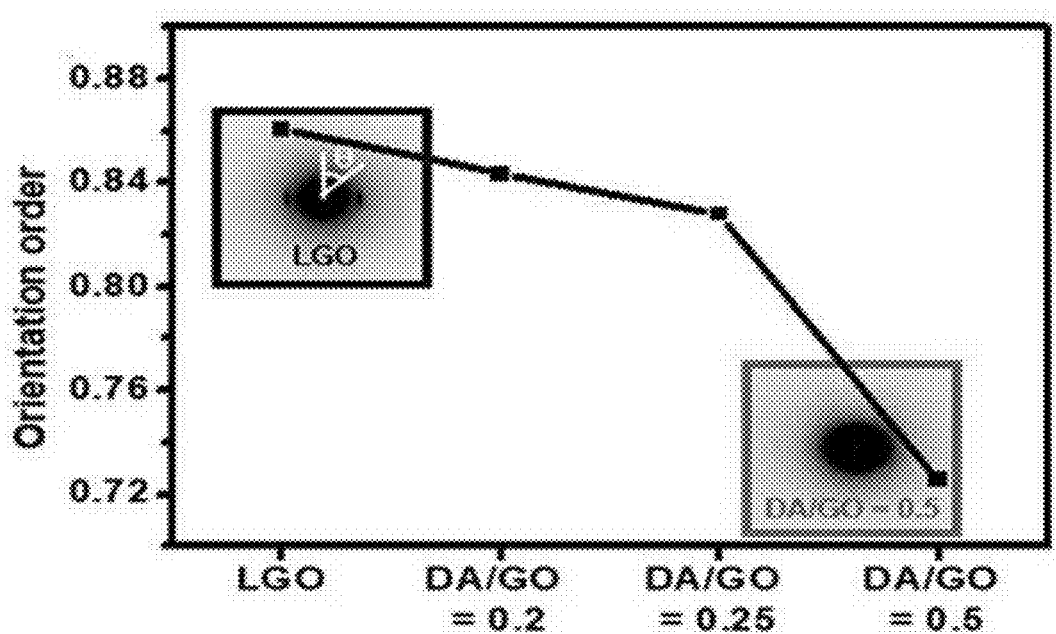
FIG. 3 is a graph representing result values of a degree of orientation of the manufactured hydrogel fiber depending on a surface polymerization ratio of a first aromatic monomer according to an exemplary embodiment of the present invention to the graphene-based compound, calculated from wide-angle X-ray scattering (WAXS) analysis results.

As shown in FIG. 3, a degree or orientation of the hydrogel fiber manufactured according to the surface polymerization ratio of the first aromatic monomer to the graphene-based compound was analyzed by wide-angle X-ray scattering (WAXS). The hydrogel fiber was manufactured by wet-spinning the graphene-based compound and the graphene composite prepared according to the weight ratio of dopamine hydrochloride to graphene oxide.

The graphene compounds and the graphene composites in which dopamine hydrochloride and graphene oxide are mixed at weight ratios of 0:1, 1:5, 1:4, and 1:2 were prepared in the same manner as in Preparation Example 2, and here, the mixing ratios of dopamine hydrochloride to graphene oxide were 0, 0.2, 0.25, and 0.5, respectively. The graphene-based compound and the graphene composite prepared above were wet-spun in the same manner as in Example 1 to manufacture fibers. Here, the fiber which was wet-spun with the graphene-based compound was a wet-spun fiber, and the fiber which was wet-spun with the graphene composite was the hydrogel fiber. As shown in FIG. 3, as the mixing ratios were increased to 0.2, 0.25, and 0.5, degrees of orientation tended to be a little decreased to 0.84, 0.82, and 0.72. This result shows that when the mixing ratio is 0.5 or more, a degree of orientation of the hydrogel fiber was decreased by surface-polymerized polydopamine with an increase of the content of dopamine. Accordingly, a mixing ratio of 0.25 at which liquid crystallinity was maintained and a degree of orientation was not greatly decreased when the hydrogel fiber was manufactured, was adopted.

Experimental Example 3

Figure 4:
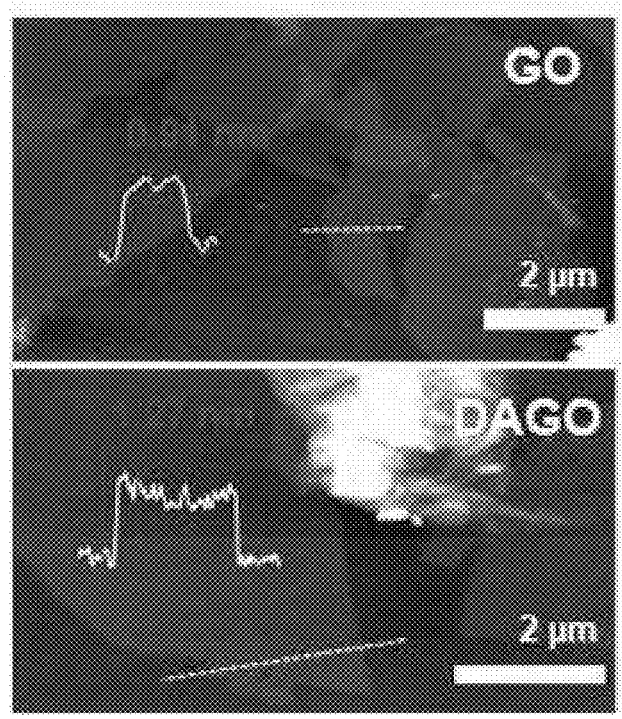
FIG. 4 is photographs showing the graphene-based compound and the graphene composite as observed through an atomic force microscope (AFM), illustrating a height profile.

As shown in FIG. 4, a graphene oxide layer in the graphene-based compound and a graphene oxide layer which was surface-polymerized with polydopamine in the graphene composite of Preparation Examples 1 and 2 were observed, using an atomic force microscope (AFM). In the case of Preparation Example 1, a traditional thickness of the graphene oxide layer of 0.91 nm or less was confirmed, and in the case of Preparation Example 2, an average thickness of 1.27 nm which was increased as compared with Preparation Example 1 was confirmed.

Experimental Example 4

Figure 5:
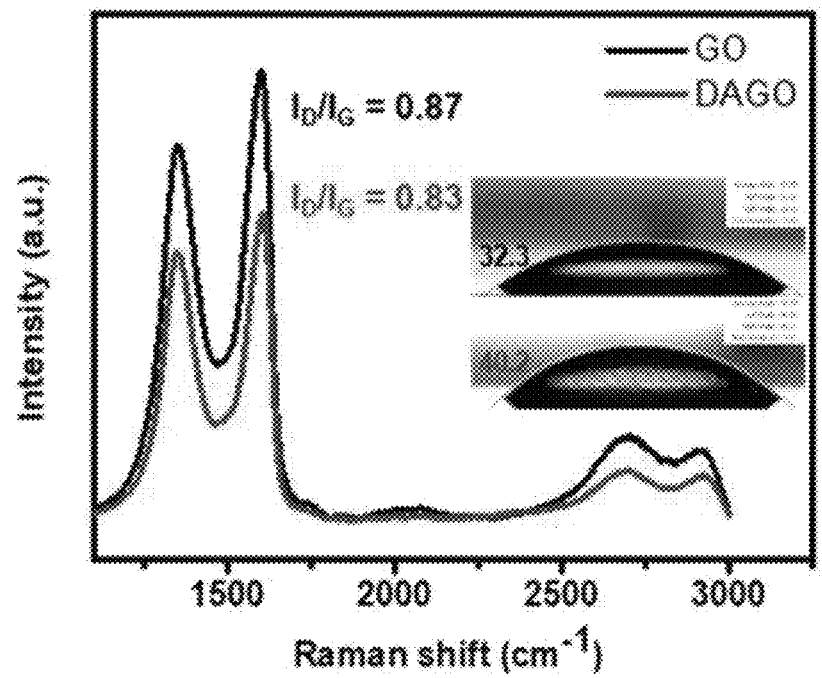
FIG. 5 is a graph in which the graphene-based compound and the graphene composite are analyzed by Raman spectroscopy, wherein the inserted image shows a result of observing a contact angle of the graphene-based compound and the graphene composite.

As shown in FIG. 5, as a result of Raman analysis of the graphene-based compound of Preparation Example 1 and the graphene composite of Preparation Example 2, a D peak was shown at 1350 $cm^{-1}$, and a G peak was shown at 1590 $cm^{-1}$.

A $I_D/I_G$ ratios of Preparation Examples 1 and 2 were 0.87 and 0.83, respectively, and it was confirmed that Preparation Example 2 was decreased as compared with Preparation Example 1. It is seen that this is a result from a decrease of an oxygen functional group as the graphene oxide in the graphene composite of Preparation Example 2 is surface-polymerized by polydopamine.

Experimental Example 5

As shown in the image internally inserted in FIG. 5, as a result of measuring contact angles of the graphene-based compound of Preparation Example 1 and the graphene composite of Preparation Example 2, 32.20 and 40.20 were found, respectively, and thus, it was confirmed that Preparation Example 2 had an increased contact angle as compared with Preparation Example 1. This result shows that as the graphene oxide in the graphene composite of Preparation Example 2 is surface-polymerized by polydopamine, an oxygen functional group is decreased to lower the hydrophilicity.

Experimental Example 6

Figure 6:
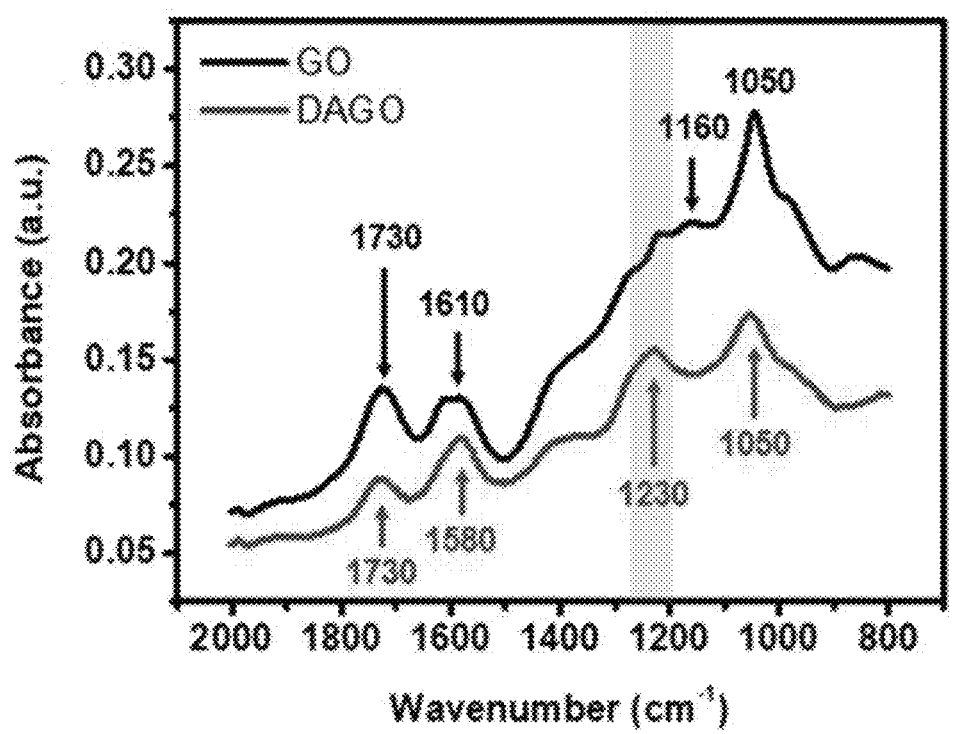
FIG. 6 illustrates a graph in which the graphene-based compound and the graphene composite are analyzed by a Fourier transform infrared spectrometer (FT-IR).

As shown in FIG. 6, as a result of analysis by infrared absorption spectroscopy, the graphene-based compound of Preparation Example 1 showed a C—O stretching vibration at 1050 cm$^{-1}$, a C=OH stretching vibration at 1160 cm$^{-1}$, a skeletal vibration from an unoxidized graphite domain at 1610 cm$^{-1}$, and a C=O stretching peak from carbonyl and carboxyl groups, respectively. In contrast, in the case of the graphene composite of Preparation Example 2, it was found that a new binding peak of a C—N stretching vibration at 1230 cm$^{-1}$ was produced, and it was clearly confirmed that surface polymerization of graphene oxide by polydopamine was carried out by the production of the binding peak. In addition, this result shows that graphene oxide which was surface-polymerized by polydopamine contains aromatic and nitrogen-containing analogues like the indole or indoline type structure derived from polydopamine, and the like.

Experimental Example 7

Figure 7:
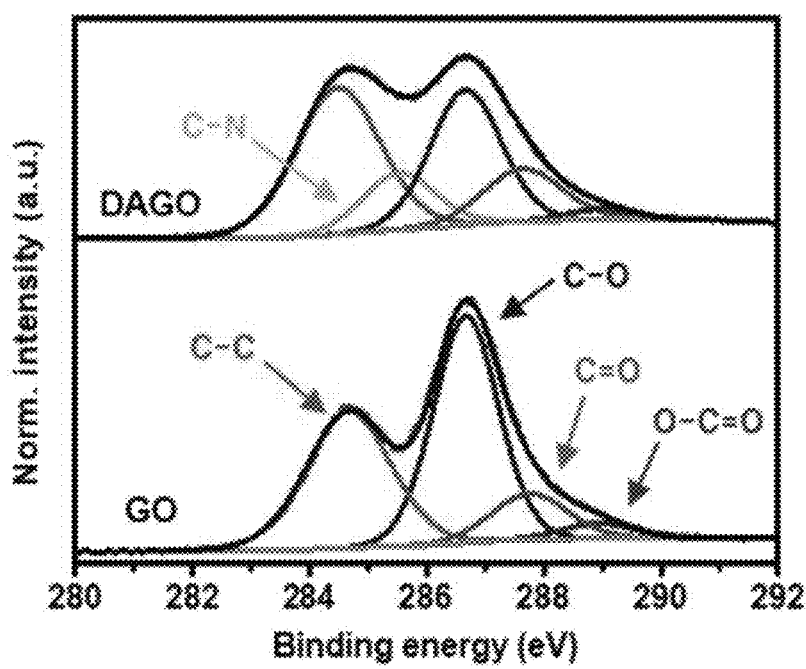
FIG. 7 illustrates a graph in which the graphene-based compound and the graphene composite are analyzed by X-ray photoelectron spectroscopy.

As shown in FIG. 7, as a result of analysis by X-ray photoelectron spectroscopy, in the case of the graphene-based compound of Preparation Example 1, a C—C bond of 284.6 eV, a C—O bond of 286.6 eV, a C=O bond of 287.9 eV, and a OC=O bond of 288.9 eV were confirmed in a C is spectrum, and in contrast, in the case of the graphene composite of Preparation Example 2, a C—N bond of 286.7 eV was further produced, and intensities of C—O, C=O, and O—C=O bonding peaks were greatly lowered. This result shows that the oxygen functional group in the graphene oxide layer and the amine group of dopamine are reacted to form an amide bond.

Experimental Example 8

Figure 8:
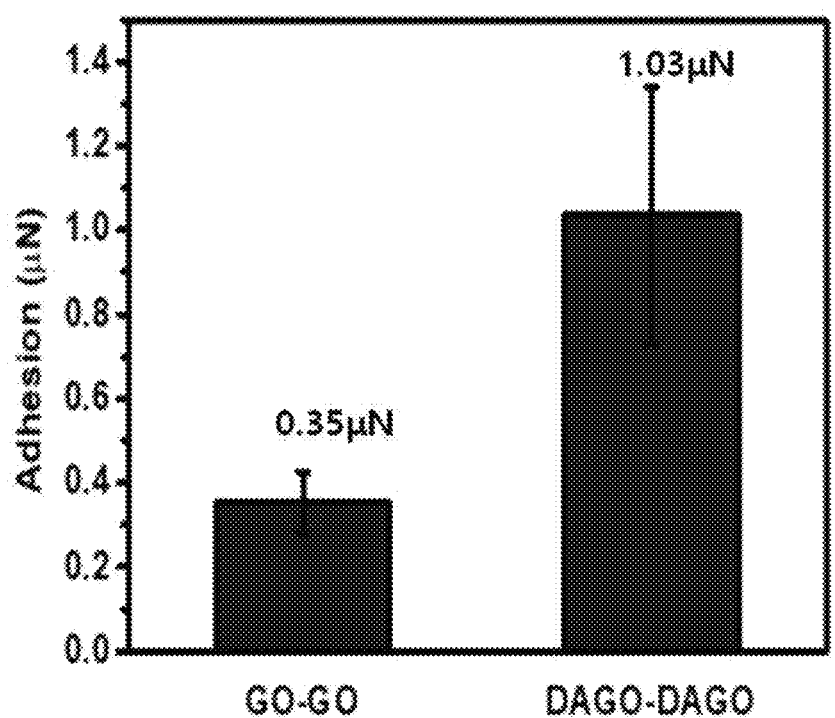
FIG. 8 illustrates a graph in which average adhesion between the graphene-based compounds and between the graphene composite is analyzed by the atomic force microscope.

As shown in FIG. 8, average adhesion between the graphene-based compounds of Preparation Example 1 and between the graphene composites of Preparation Example 2 was analyzed by a pull-off test using an atomic force microscope. In FIG. 8, GO-GO refers to average adhesion between the graphene-based compounds, and DAGO-DAGO refers to average adhesion between the graphene composites. GO-GO and DAGO-DAGO were 0.35 and 1.03 μN, respectively, and it was confirmed that DAGO-DAGO had improved adhesion as compared with GO-GO. In the case of DAGO-DAGO, the amount of the oxygen functional group was decreased due to the surface polymerization by polydopamine in the graphene composite, and thus, electrical repulsive force between the graphene oxide layers surface-polymerized with polydopamine was decreased, thereby obtaining this result. By the adhesion improvement, it is confirmed that the graphene oxide layer which was surface-polymerized with polydopamine in the graphene-based liquid crystal fiber was more densely filled, and thus, the defects and pores in the graphene-based liquid crystal fiber were decreased.

Experimental Example 9

Figure 9:
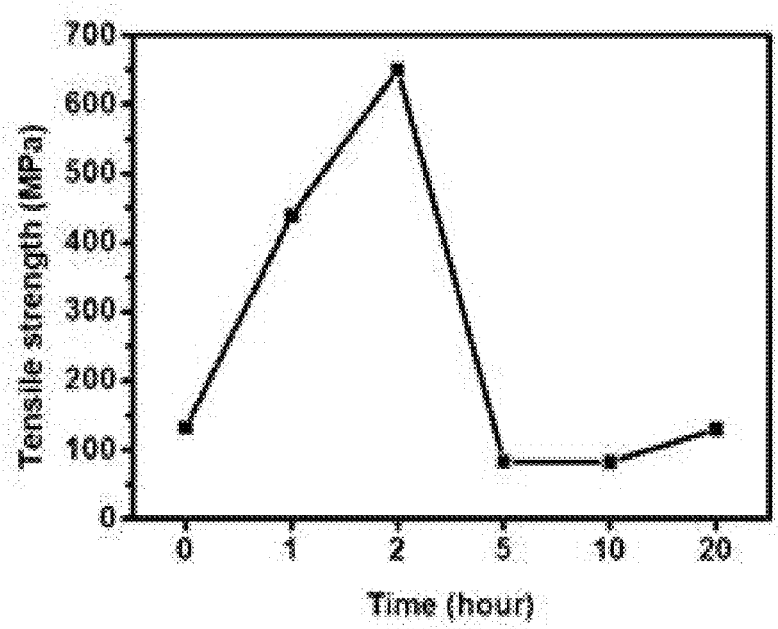
FIG. 9 is a graph representing tensile strength measurement values of carbon fiber measured depending on a time of filling a fiber manufactured by set-spinning the graphene-based compound with a second aromatic polymer.

The graphene-based compound prepared in Preparation Example 1 was wet-spun to manufacture a wet-spun fiber, and the wet-spun fiber was immersed in the second aromatic monomer, thereby measuring the tensile strength value of the carbon fiber which was carbonized, depending on the filling time with the second aromatic polymer. The wet spinning process and the carbonization process were performed in the same manner as in Example 1, and the immersion time was 1 hour to 20 hours. As shown in FIG. 9, when the immersion time was 2 hours, the fiber showed a highest tensile strength value, and then as the immersion time was increased, the tensile strength value was rapidly decreased. This result is due to the fact that as the immersion time is increased, the surface polymerization of polydopamine having weaker mechanical properties than the graphene oxide layer in the fiber was excessively carried out.

Experimental Example 10

Figure 10:
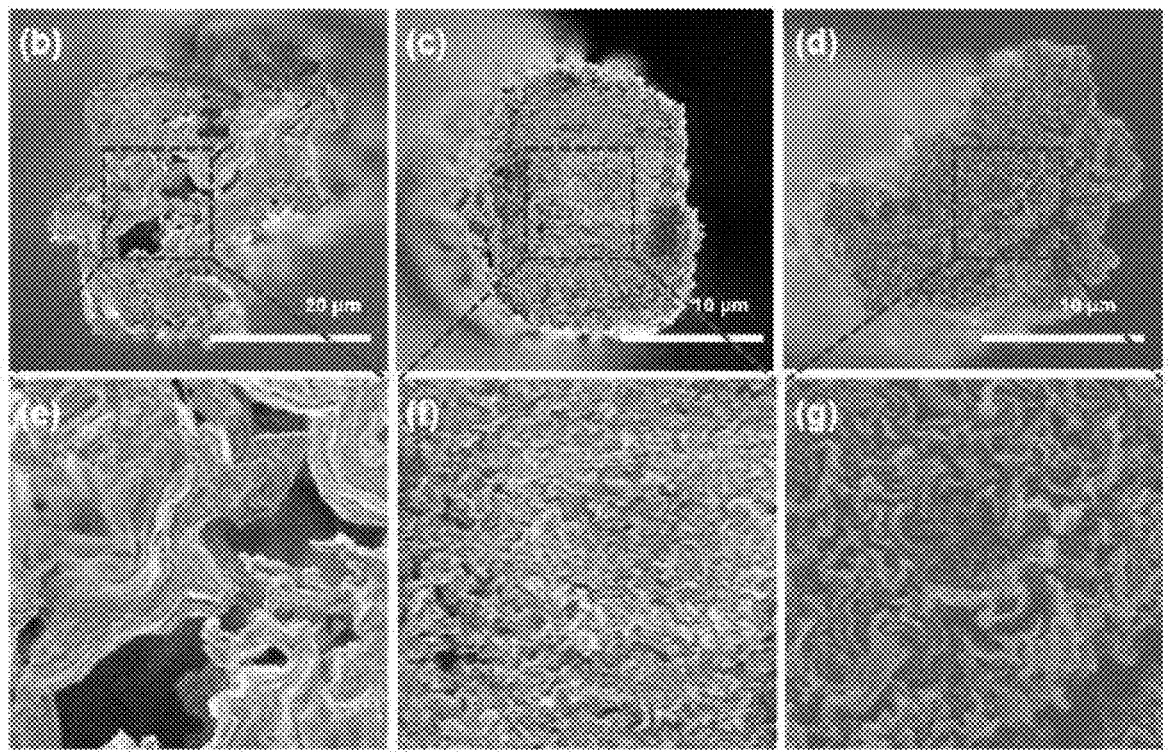
FIG. 10 is photographs of carbon fibers manufactured in the Example and the Comparative Examples, as observed through a scanning electron microscope (SEM), in which (b) and (e) are the photographs of Comparative Example 1, (c) and (f) are the photographs of Comparative Example 2, and (d) and (g) are the photographs of Example 1, as observed through the scanning electron microscope.

The sections of the carbon fibers manufactured in the Example and the Comparative Examples were observed by a scanning electron microscope, and as a result, it was confirmed that in Example 1 (d, g), the pores were much decreased as compared with the fiber manufactured in Comparative Example 2 (c, f), whereby there are substantially no pores, as shown in FIG. 10. In Example 1 (d, g), the same graphene composite as Comparative Example 2 (c, f) was used, but preparation was performed by adding an immersion step by polydopamine, and it means that as the immersion step was added as compared with Comparative Example 2 (c, f), the pores were almost removed.

Meanwhile, it was observed that Comparative Example 2 (c, f) had relatively high density as compared with Comparative Example 1 (b, e), was confirmed to have decreased wrinkles and pores.

Experimental Example 11

Figure 11:
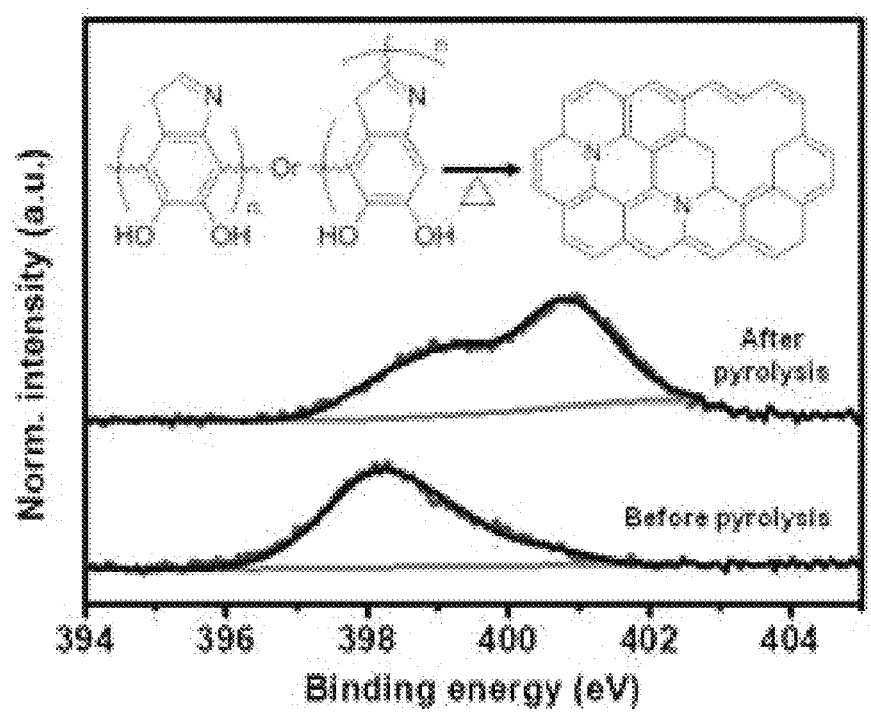
FIG. 11 is a graph representing results of analyzing the graphene-based crystal liquid fiber according to an exemplary embodiment of the present invention before and after a carbonization process, by the X-ray photoelectron spectroscopy.

In order to confirm the chemical bonding state of the graphene-based liquid crystal fiber manufactured in Example 1 following internal structure transformation before and after the carbonization process, bonding energy was analyzed by X-ray photoelectron spectroscopy. As shown in FIG. 11, in the state of the graphene-based liquid crystal fiber before the carbonization process, a N is peak was pyrrolic N, a N is peak of the graphene-based carbon fiber after the carbonization process confirmed the presence of pyridinic N at 398.0 eV, pyrrolic N at 399.0 eV, and graphitic N at 400.7 eV. The pyridinic N before the carbonization process was transformed into graphitic N when being decreased by thermal decomposition through the carbonization process. This shows that as shown in the image inserted in FIG. 11, polydopamine formed of the crosslinked indole-quinone units after the carbonization process is converted into graphitic N which is the graphitic region abundant in nitrogen by thermal decomposition.

Experimental Example 12

Figure 12:
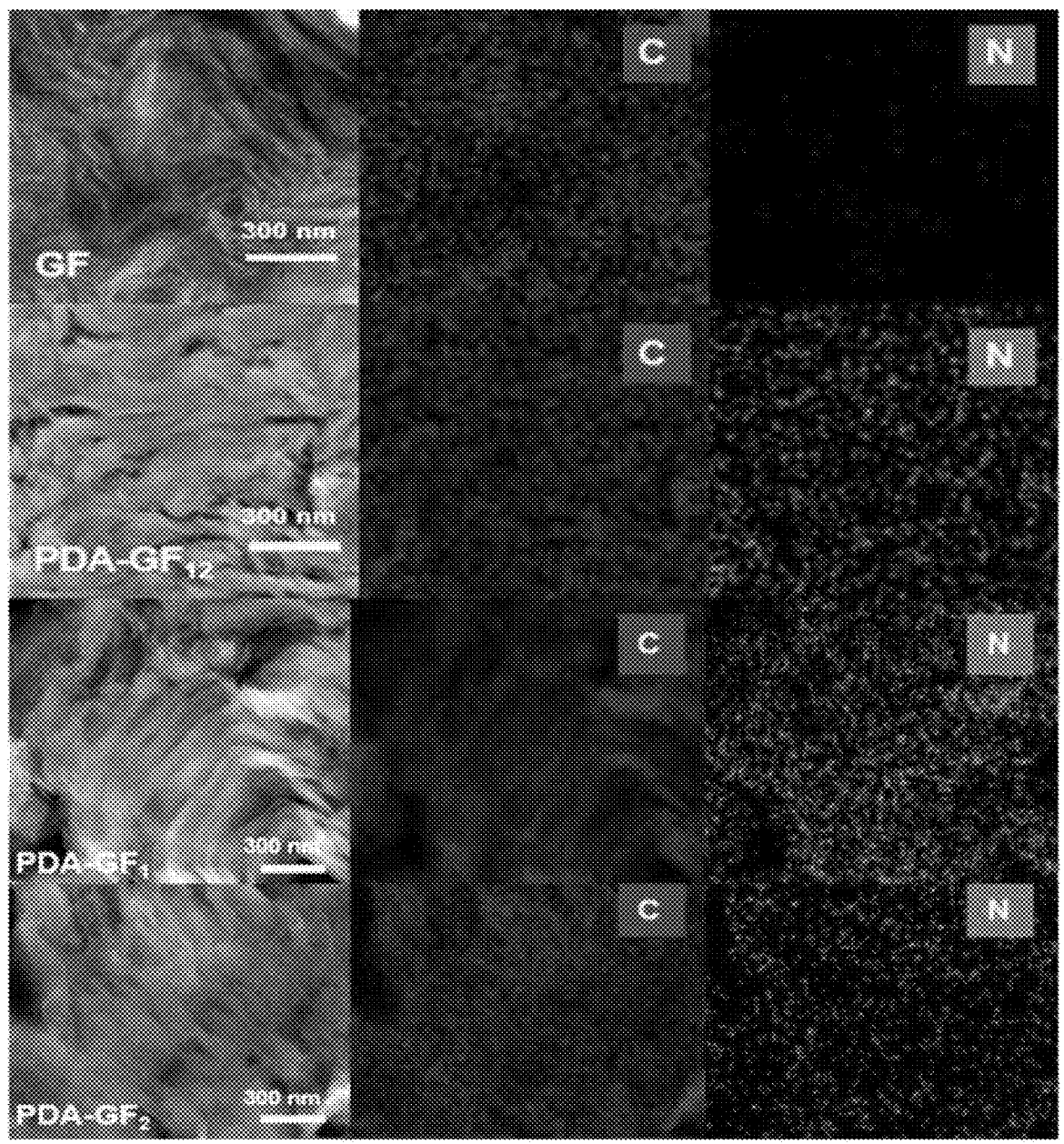
FIG. 12 is photographs showing the carbon fibers manufactured in the Example and the Comparative Example as observed through a high-resolution transmission electron microscope (HF-TEM), and photographs showing elemental distribution as observed through elemental mapping by energy dispersive spectroscopy (EDS).

As shown in FIG. 12, the sections of the carbon fibers manufactured in the Example and the Comparative Examples were observed by a transmission electron microscope, and the distribution of carbon (C) and nitrogen (N) elements was confirmed by elemental mapping.

In the case of Example 1 (PDA-GF12), it was confirmed that carbon and nitrogen elements were present in significantly uniform distribution. This result shows that the defects and pores in the graphene-based carbon fiber were greatly decreased by the two-step process of a surface polymerization step using polydopamine and a filling step.

In the case of Comparative Example 1 (GF), only a carbon element was confirmed, and in the case of Comparative Example 3 (PDA-GF2), it was confirmed that distribution of carbon and nitrogen elements was uniform. This shows that in the case of Comparative Example 3 (PDA-GF12), polydopamine was uniformly infiltrated in the entire volume inside the fiber by the filling step.

TABLE 1

|  | Example 1 | Comparative Example 1 | Comparative Example 2 | Comparative Example 3 |
|---|---|---|---|---|
| Elongation (%) | 0.73 | 0.45 | 0.41 | 0.63 |
| Tensile strength (Mpa) | 650 | 65 | 453 | 235 |
| Tensile modulus (Gpa) | 80.3 | 15.65 | 108.6 | 46.9 |

Table 1 shows the mechanical properties of the Example and the Comparative Examples. The tensile strengths of Example 1 and Comparative Examples 1 to 3 were measured as 650, 65, 453, and 235 MPa, and in the case of Example 1, the highest tensile strength value was shown. Example 1 represented a tensile strength which is 10 times higher than Comparative Example 1.

Average values of elongation at break and a tensile modulus of Example 1 and Comparative Examples 1 to 3 were measured as 0.73, 0.45, 0.41, 0.63%, and 80.3, 15.65, 108.6, 46.9 GPa, respectively. Example 1 represented excellent values of elongation and a tensile strength as compared with Comparative Examples 1 to 3, and was confirmed to have an increased tensile strength by 822%, an increased modulus of elasticity by 490%, and an increased elongation by 161%, as compared with Comparative Example 1. In the case of Example 1, the defects and pores of the graphene-based carbon fiber were significantly decreased by two-step synthesis process of a surface polymerization step and a filling step using polydopamine, thereby representing the result.

In the case of Comparative Example 2, a modulus of elasticity was increased as compared with Comparative Example 1. This result shows that unlike Comparative Example 1, the graphene composite used in Comparative Example 2 was surface-polymerized by polydopamine, and interlayer adhesion of graphene oxide which was surface-polymerized in the graphene composite was improved.

TABLE 2

|  | Example 1 | Comparative Example 1 | Comparative Example 2 | Comparative Example 3 |
|---|---|---|---|---|
| Nitrogen content (at %) | 3.13 | 0 | 1.56 | 1.68 |
| Electrical conductivity (10$^4$ S/m) | 11.32 | 2.36 | 3.5 | 5.1 |

As shown in Table 2, the nitrogen content and the electrical conductivity of Example 1 and Comparative Examples 1 to 3 were measured, and as a result, the electrical conductivity (10$^4$S/m) was 11.32, 2.36, 3.5, and 5.1, respectively, and in the case of Example 1, the highest electrical conductivity was confirmed.

The nitrogen contents of Example 1 and Comparative Examples 1 to 3 were 3.13, 0, 1.56, and 1.68, respectively, and Example 1 had the highest nitrogen content. The electrical conductivity tends to be improved with an increase of the nitrogen content.

This is resulted from the fact that in the case of Example 1, the surface polymerization step by polydopamine and the filling step were performed, and the polydopamine in the graphene-based liquid crystal fiber is thermally decomposed by a carbonization process to be thermally converted into a nitrogen-doped graphene structure.

This is resulted from the fact that in the case of Example 1, a two-step synthesis process of the surface polymerization step by polydopamine and the filling step was performed, and the surface-polymerized polydopamine in the graphene-based liquid crystal fiber is thermally decomposed by a carbonization process to be converted into a nitrogen-doped graphene structure.

The manufacturing method of the graphene-based liquid crystal fiber according to various exemplary embodiments of the present invention suppresses formation of defects and pores arising from a folding and wrinkling phenomenon of the graphene-based compound occurring during spinning of the fiber, maintains the liquid crystal structure, and allows the texture of the graphene-based liquid crystal fiber to be dense.

In addition, the graphene-based liquid crystal fiber according to various exemplary embodiments of the present invention may have a high diameter uniformity and orientation, and the graphene-based liquid crystal fiber may have a dense texture which substantially does not include defects and pores in the graphene-based carbon fiber, by a carbonation step.

In addition, the manufacturing method of the graphene-based carbon fiber according to various exemplary embodiments of the present invention has a merit of improving both mechanical physical properties and electrical conductivity of the graphene-based carbon fiber.

What is claimed is:

1. A manufacturing method of a graphene-based liquid crystal fiber comprising:
   (a) polymerizing a first aromatic monomer on a graphene-based compound to prepare a graphene composite in which a first aromatic polymer is surface-polymerized on the graphene-based compound;
   (b) wet-spinning the graphene composite to manufacture a hydrogel fiber; and
   (c) polymerizing a second aromatic monomer on the hydrogel fiber to fill pores of the hydrogel fiber with a second aromatic polymer,
   wherein the pores of the hydrogel fiber are filled by immersing, at 10° C. to 50° C. for 1 hour to 5 hours, the hydrogel fiber in a solution in which the second aromatic monomer is dissolved.

2. The manufacturing method of a graphene-based liquid crystal fiber of claim 1, wherein a weight ratio of the graphene-based compound to the first aromatic monomer is 1:0.01 to 1:10.

3. The manufacturing method of a graphene-based liquid crystal fiber of claim 1, wherein in a process of (a), the first aromatic polymer which is surface-polymerized on the graphene-based compound forms a surface layer with a thickness of 0.1 to 1 nm.

4. The manufacturing method of a graphene-based liquid crystal fiber of claim 1, wherein in a process of (a), the surface polymerization of the first aromatic monomer is oxidation polymerization of the first aromatic monomer on a surface of the graphene-based compound.

5. The manufacturing method of graphene-based liquid crystal fiber of claim 1, wherein a weight ratio of the graphene composite to the second aromatic monomer is 1:0.1 to 1:100.

6. The manufacturing method of graphene-based liquid crystal fiber of claim 1, wherein the first aromatic monomer and the second aromatic monomer are a phenolic compound containing an amine group.

7. A manufacturing method of a graphene-based carbon fiber, comprising:
   (a) polymerizing a first aromatic monomer on a graphene-based compound to prepare a graphene composite in which a first aromatic polymer is surface-polymerized on the graphene-based compound;
   (b) wet-spinning the graphene composite to manufacture a hydrogel fiber; and
   (c) filling pores of the hydrogel fiber with a second aromatic polymer to manufacture a graphene-based liquid crystal fiber; and
   (d) carbonizing the graphene-based liquid crystal fiber, wherein the pores of the hydrogel fiber are filled by immersing, at 10° C. to 50° C. for 1 hour to 5 hours, the hydrogel fiber in a solution in which the second aromatic monomer is dissolved.

8. The manufacturing method of a graphene-based carbon fiber of claim 7, wherein filling comprises polymerizing a second aromatic monomer on the hydrogel fiber to fill pores of the hydrogel fiber with the second aromatic polymer.

9. A graphene-based liquid crystal fiber comprising: a hydrogel fiber comprising a graphene-based compound modified with a first aromatic polymer and a second aromatic polymer filled in pores of the hydrogel fiber,
   wherein $I_D/I_G$ of the graphene-based compound and the graphene-based compound modified with the first aromatic polymer satisfies the following Equation 1:

$$(I_D/I_G)_G/(I_D/I_G)_C > 1 \qquad \text{[Equation 1]}$$

wherein $I_D/I_G$ is a measure of relative crystallinity which represents density of defects, and is calculated as a ratio of a maximum intensity value of a peak of an absorption region at $1350\pm10$ cm$^{-1}$ ($I_D$) to a maximum intensity value of a peak of an absorption region at $1590\pm10$ cm$^{-1}$ ($I_G$), in Raman spectroscopic analysis, $(I_D/I_G)_G$ refers to $I_D/I_G$ of the graphene-based compound, and $(I_D/I_G)_C$ refers to $I_D/I_G$ of a graphene composite modified with the first aromatic polymer, and
   wherein $(I_D/I_G)_C$ of the graphene composite modified with the first aromatic polymer is 1 or less.

10. The graphene-based liquid crystal fiber of claim 9, wherein the first aromatic monomer and the second aromatic monomer are a phenolic compound containing a nitrogen atom in a structural unit.

11. The graphene-based liquid crystal fiber of claim 9, wherein adhesion of a graphene composite modified with the first aromatic polymer satisfies the following Equation 2:

$$F_C/F_G > 2 \qquad \text{[Equation 2]}$$

wherein $F_G$ refers to adhesion between the graphene-based compounds, and $F_C$ refers to adhesion of the graphene composite modified with the first aromatic polymer.

12. A graphene-based carbon fiber comprising a graphene-based compound and graphitic nitrogen, having an electrical conductivity of $1\times10^5$ S/m or more and $1\times10^6$ S/m or less, wherein an inside of the graphene-based carbon fiber is formed of a dense texture which substantially does not include pores.

13. The graphene-based carbon fiber of claim 12, wherein a tensile strength is 300 MPa or more.

14. The graphene-based carbon fiber of claim 12, wherein the graphene-based carbon fiber contains 2 to 10 atom % of the graphitic nitrogen.

* * * * *